United States Patent
Morris, II et al.

(10) Patent No.: US 10,984,338 B2
(45) Date of Patent: Apr. 20, 2021

(54) DYNAMICALLY UPDATED PREDICTIVE MODELING TO PREDICT OPERATIONAL OUTCOMES OF INTEREST

(71) Applicant: Predikto, Inc, Atlanta, GA (US)

(72) Inventors: Robert G. Morris, II, Atlanta, GA (US); William McGinnis, Atlanta, GA (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 0 days.

(21) Appl. No.: 15/134,048

(22) Filed: Apr. 20, 2016

(65) Prior Publication Data

US 2016/0350671 A1    Dec. 1, 2016

Related U.S. Application Data

(60) Provisional application No. 62/167,414, filed on May 28, 2015.

(51) Int. Cl.
*G06N 20/00* (2019.01)
*G05B 23/02* (2006.01)

(52) U.S. Cl.
CPC ......... *G06N 20/00* (2019.01); *G05B 23/0229* (2013.01)

(58) Field of Classification Search
None
See application file for complete search history.

(56) References Cited

U.S. PATENT DOCUMENTS 6,301,572 B1    10/2001  Harrison
6,760,722 B1    7/2004  Raghunandan
(Continued)

FOREIGN PATENT DOCUMENTS

WO    2016/077127    5/2016

OTHER PUBLICATIONS

Masud et al. Classification and Novel Class Detection in Concept-Drifting Data Streams under Time Constraints. IEEE Transactions on Knowledge and Data Engineering. vol. 23 Issue 6, Jun. 2011. pp. 859-874.*

(Continued)

*Primary Examiner* — Alexey Shmatov
*Assistant Examiner* — Robert Bejcek, II
(74) *Attorney, Agent, or Firm* — Locke Lord LLP; Scott D. Wofsy; Georgi Korobanov

(57) ABSTRACT

Various examples are provided for dynamically updating or adapting predictive modeling for prediction of outcomes of interest for operating systems and processes. Embodiments of the disclosure may provide systems, apparatus, processes, and methods for generating and deploying dynamically updated predictive models. In some embodiments, the predictive model may be deployed for the purpose of predicting operational outcomes of interests in operating systems, hardware devices, machines and/or processes associated therewith prior to the operational outcomes of interest occurring. The predictions can, for example, provide sufficient time for maintenance or repairs to be scheduled and carried out to avoid the predicted operational outcome. Autonomous evaluation of features allows the predictive models to be dynamically updated in response to changes in the environment or monitored data.

18 Claims, 8 Drawing Sheets

(56) References Cited

U.S. PATENT DOCUMENTS

| | | |
|---|---|---|
| 6,847,918 B2 | 1/2005 | Loecher |
| 7,031,950 B2 | 4/2006 | Darken et al. |
| 7,100,084 B2 | 8/2006 | Unkle et al. |
| 7,136,779 B2 | 11/2006 | Nitsche et al. |
| 7,233,886 B2 | 6/2007 | Wegerich et al. |
| 7,299,162 B2 | 11/2007 | Loecher et al. |
| 7,403,850 B1 | 7/2008 | Boutin et al. |
| 7,447,666 B2 | 11/2008 | Wang |
| 7,464,063 B2 | 12/2008 | Vatchkov et al. |
| 7,657,299 B2 * | 2/2010 | Huizenga ............... A61B 5/055 382/276 |
| 7,945,524 B2 | 5/2011 | Anderson et al. |
| 8,060,342 B2 | 11/2011 | Marvasti |
| 8,155,820 B2 * | 4/2012 | Eklund ................ G06F 11/008 701/29.2 |
| 8,200,549 B1 | 6/2012 | Crean et al. |
| 8,275,577 B2 | 9/2012 | Herzog |
| 8,301,406 B2 | 10/2012 | Lee et al. |
| 8,374,745 B2 | 2/2013 | Zhang et al. |
| 8,407,163 B2 | 3/2013 | Andreoli |
| 8,527,223 B2 | 9/2013 | Abuali et al. |
| 8,676,721 B2 | 3/2014 | Piovesan et al. |
| 8,700,550 B1 | 4/2014 | Bickford et al. |
| 8,712,929 B1 | 4/2014 | Bickford et al. |
| 8,751,421 B2 | 6/2014 | Anderson et al. |
| 8,781,982 B1 | 7/2014 | Das et al. |
| 8,799,042 B2 | 8/2014 | Hampapur et al. |
| 8,849,732 B2 | 9/2014 | Raileanu et al. |
| 8,868,985 B2 | 10/2014 | Hackstein et al. |
| 8,886,574 B2 | 11/2014 | Yuan et al. |
| 8,892,478 B1 | 11/2014 | Bickford et al. |
| 9,014,918 B2 | 4/2015 | Hagen et al. |
| 9,015,059 B2 | 4/2015 | Sims, III et al. |
| 9,032,803 B2 | 5/2015 | Griffaton |
| 9,127,597 B2 | 9/2015 | Masiello et al. |
| 9,141,915 B2 | 9/2015 | Alonso et al. |
| 9,171,261 B1 | 10/2015 | Zadeh |
| 2003/0126104 A1 * | 7/2003 | Evans-Beauchamp ..................... G06N 7/005 |
| 2007/0260568 A1 * | 11/2007 | Perng ..................... G06N 5/025 706/47 |
| 2008/0114506 A1 | 5/2008 | Davis et al. |
| 2010/0228423 A1 * | 9/2010 | Howell .............. G05B 19/0428 701/31.4 |
| 2011/0047112 A1 | 2/2011 | Ketabdar et al. |
| 2012/0218127 A1 | 8/2012 | Kroen |
| 2012/0310865 A1 | 12/2012 | Wang |
| 2013/0144407 A1 | 6/2013 | Nausley et al. |
| 2013/0197854 A1 | 8/2013 | Liao |
| 2013/0210405 A1 | 8/2013 | Whipple et al. |
| 2014/0039817 A1 | 2/2014 | Dayan |
| 2014/0200872 A1 | 7/2014 | Fang et al. |
| 2014/0200873 A1 | 7/2014 | Fang et al. |
| 2014/0336791 A1 | 11/2014 | Asenjo et al. |
| 2014/0337086 A1 | 11/2014 | Asenjo et al. |
| 2014/0337277 A1 | 11/2014 | Asenjo et al. |
| 2014/0365191 A1 | 12/2014 | Zyglowicz et al. |
| 2014/0365264 A1 | 12/2014 | Smiley et al. |
| 2015/0073751 A1 | 3/2015 | Liao et al. |
| 2015/0135012 A1 | 5/2015 | Bhalla et al. |
| 2015/0148919 A1 * | 5/2015 | Watson ................. G06N 7/005 700/31 |
| 2015/0227838 A1 | 8/2015 | Wang et al. |
| 2015/0262060 A1 | 9/2015 | Husain et al. |
| 2015/0262095 A1 | 9/2015 | Rajasekaran et al. |
| 2015/0323926 A1 | 11/2015 | Wang |

OTHER PUBLICATIONS

Wu et al. A top-down strategy with temporal and spatial partition for fault detection and diagnosis of building HVAC systems. Energy and Buildings 43 (2011) 2134-2139.*

Wang et al. Online Selecting Discriminative Tracking Features using Particle Filter. Proceedings of the 2005 IEEE Computer Society Conference on Computer Vision and Pattern Recognition (CVPR'05) 6 Pages. 2005.*

* cited by examiner

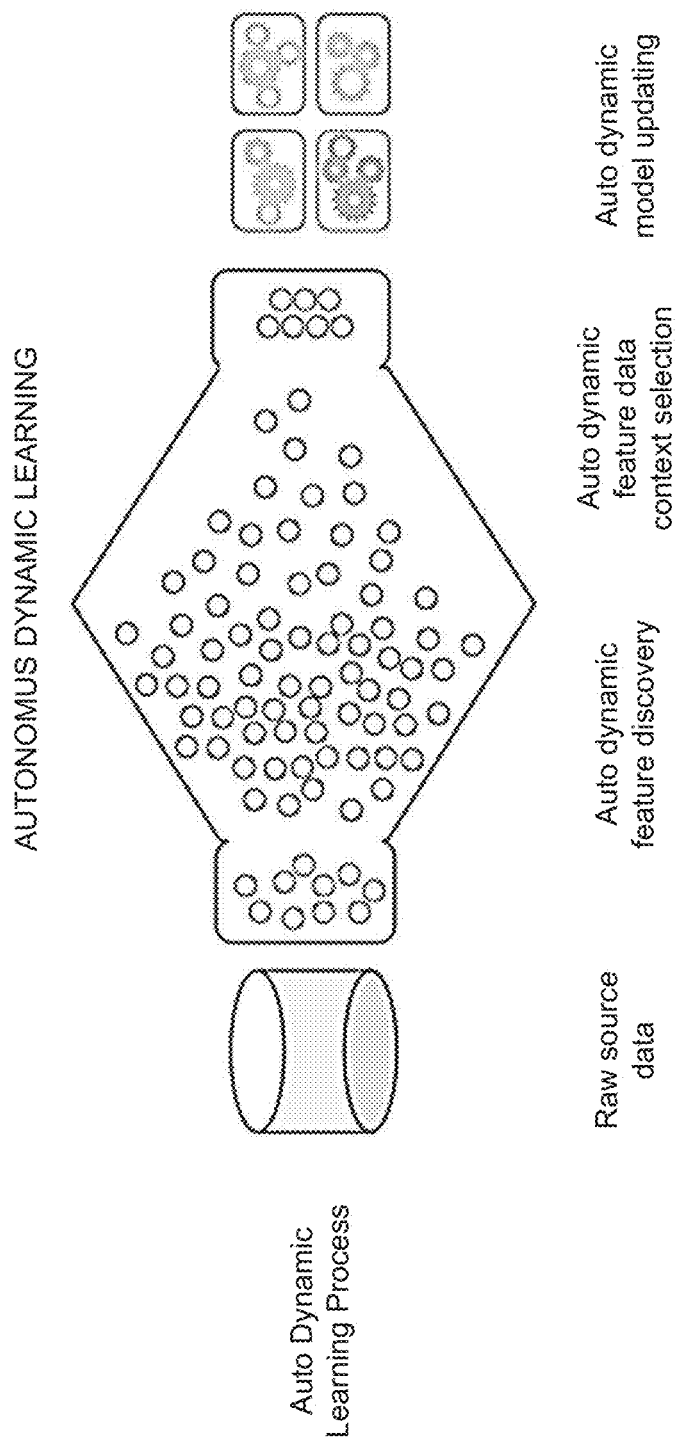

DYNAMICALLY UPDATED PREDICTIVE MODELING TO PREDICT OPERATIONAL OUTCOMES OF INTEREST

CROSS REFERENCE TO RELATED APPLICATIONS

This application claims priority to, and the benefit of, U.S. provisional application entitled "Generation and Deployment of Dynamically Updated Predictive Models," having Ser. No. 62/167,414 and filed May 28, 2015, which is hereby incorporated by reference in its entirety.

FIELD OF THE INVENTION

The present invention provides systems and methods for predicting operational outcomes of interest in operating systems, hardware devices, or machines. Autonomous evaluation of features allows the predictive models to be dynamically updated in response to changes in the environment or monitored data during operation thereof.

BACKGROUND

With the computerized automation of many operating systems involving the operation of machines or hardware-enabled devices, a wide range of monitoring can be carried out for the operational control of the respective systems. In many cases, the monitored information extracted from the systems during operation thereof (e.g., raw data collected through sensors distributed about the operating system) is sent to a controller, user device or other processing device, which can then adjust or otherwise modify the operation of the system or a portion of the system in response to the monitored conditions. These controllers (or other devices) can utilize the monitored data in real time to control operation of individual pieces of equipment (e.g., through a local controller) and/or the operation of the overall system or process in real time or substantially in real time. For instance, vehicles such as trains, planes and automobiles can include localized controllers that monitor operational data to control individual components of the vehicle (e.g., the transmission) while a master controller can also monitor overall operation of integrated systems including the component (e.g., the drive train including the engine) or the vehicle itself. In industrial settings, combinations of localized and/or master controllers (or other devices) can interact with each other and/or equipment on the plant floor to control the automated process in real time or substantially in real time.

The monitored information can also be analyzed to evaluate the real time or substantially real time conditions of the operating system and to predict the likelihood of whether future operational conditions that may be of interest, such as, for example, faults or failures of the process, device or individual equipment/hardware might occur. Notably, the large amounts of data available from the various machines or other hardware devices (e.g., components) that comprise many operating systems that can be utilized to undertake predictive analysis presents increased problems in actually conducting the analysis. Given the vast amount of information that is available today, and that will increasingly be available in the future, the full operational aspects of an operating system, hardware device, or machine cannot be analyzed fully today, even with use of the most sophisticated data analysis systems and highly trained data scientists. In short, the vast amount of data available in today's complex systems has quickly become too large for existing systems and personnel to assess. This means that only subsets of available information can adequately be analyzed today, and such subsets are necessarily the result of subjective selection techniques. The subjectivity involved in the analysis of large datasets today means that much of the operational data relevant to prediction of operational events in operating systems, hardware devices and machines may not be incorporated to generate predictive models. In short, existing predictive models do not currently exist that exhibit the accuracy needed to provide allow suitable foresight into potential operational outcomes that can affect the operation of an operating system, hardware device, or machine.

Such proactive monitoring, evaluation and, potential modification of operating systems, hardware devices or machines is further complicated using prior art methodologies by the sparsity of some of the monitored data that is generally made available for use thereof, especially in view of the limits of data analysis today. While a master controller (or on-site server) can receive some of the monitored data from the localized controllers or other devices (such as sensors associated with the machine or hardware device) on a regular (or scheduled) basis, large portions of the monitored data may be non-uniformly sampled. In some cases, a defined set of monitored data may only be received when a trigger event occurs, where such a "trigger event" may only randomly occur. As these events may occur only sporadically during operation of the system and only a limited amount of data is retained, the resulting monitored data can be sparse. Accordingly, data collected in relation to a "trigger event" can have limited utility in providing forward looking—that is, predictive—information because it is, by its very nature, backward looking—that is, reactive.

There remains a need for improved systems and methods for data collection, selection, analysis and prediction so that operational conditions affecting the operation of operating systems, hardware devices, or machines can be better predicted to, therefore, allow modification of the operation thereof so as to avoid the occurrence of an event or to enable improvements in the overall operational conditions. It would further be desirable to allow large amounts of data generated from complex machinery to be analyzed sufficiently to enable improved predictive models pertinent to the ongoing operation of the operating systems, hardware devices, or machines. The present invention provides these and other benefits.

SUMMARY OF THE INVENTION

The present invention provides systems and methods for predicting operational outcomes of interest in operating systems, hardware devices, or machines. Autonomous evaluation of features allows the predictive models to be dynamically updated in response to changes in the environment or monitored data.

In some embodiments, the invention comprises systems and methods for predicting at least one operational outcome of interest associated with an operating system, hardware device, or machine. In this regard, the inventions comprise at least one memory that stores computer-executable instructions, and at least one processor that, when executing the computer-executable instructions, configures the system to: collect source data collected from over a period of time, wherein the source data is derived from information obtained from operation of an operating system, hardware device, or machine. Feature data context values (feature data configurations) are created from feature data derivable from the source data, and the feature data context values are derivable from a plurality of operational parameters associated with operation of the operating system, hardware device, or machine during the period of time in which the source data was generated. The systems and methods are configurable to analyze the feature data context values by application of a plurality of statistical models, independently, to each feature data context value, whereby a correlation is generated between the feature data in each feature data context value and each of the applied statistical models. From each correlation a probability model associated with the likelihood of occurrence of an operational outcome of interest is generated that is relatable to operation of the operating system, hardware device, or machine. The systems and methods are also configurable to validate each of the plurality of probability models, by either or both of: testing each of the probability models, independently, against at least some of the source data selected from the data source, or combining some of all of the plurality of the probability models to generate a supermodel and testing the supermodel against at least some of the source data selected from the data source. The systems and methods are further configurable to select at least one of the validated probability models for deployment in the prediction of the operational outcome of interest.

In further embodiments, the systems and methods of the present invention are configurable to test at least one of the validated probability models against the updated source data, wherein the updated source data is derivable from information obtained during continued operation of the operating system, hardware device, or machine. Yet further, the systems and methods can be configured to remove from use at least one predictive model that has been superseded by one or more subsequently generated probability models, wherein the subsequently generated probability models have an increased correlation with the likelihood of occurrence of the operational outcome of interest, and wherein the increased correlation is determined, at least in part, by source data derived from information generated from operation of the operating system, hardware device, or machine that occurred after generation of the source data used to generate the at least one probability model that was removed from use. Still further, the present invention comprises systems and methods that are optionally configurable to remove at least some of the source data or feature data context values prior to analysis with the plurality of statistical models and to later re-incorporate at least some of the removed data or feature data context values at a later time. The source data comprises information derived from one or more sensors associated with the operating system, hardware device, or machine, and recorded information associated with operation of the operating system, hardware device, or machine.

The systems and methods are broadly applicable to predicting one or more operational outcomes of interest in a wide variety of industrial processes, including, but not limited to, vehicles, industrial machines or industrial processes. In some embodiments, the plurality of operational parameters is derivable from information comprising one or more of at least times, locations, or environmental conditions associated with operation of the operating system, hardware device, or machine. Signaling is also incorporated in some embodiments herein, where such signals are associable with the probability that the operational outcome of interest is likely to occur within a time period of interest. Yet further, the at least one operational condition of interest can include a fault, failure, energy use, resource use, production quantity, production quality, compliance with required operational parameters, or operational cost metrics.

Additional advantages of the invention will be set forth in part in the description that follows, and in part will be apparent from the description, or may be learned by practice of the invention. The advantages of the invention will be realized and attained by means of the elements and combination particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 2A and 2B illustrate an example of feature discovery and runtime processes that can be implemented by the predictive system of FIG. 1, in accordance with various embodiments of the present disclosure.

DETAILED DESCRIPTION

Figure 1:
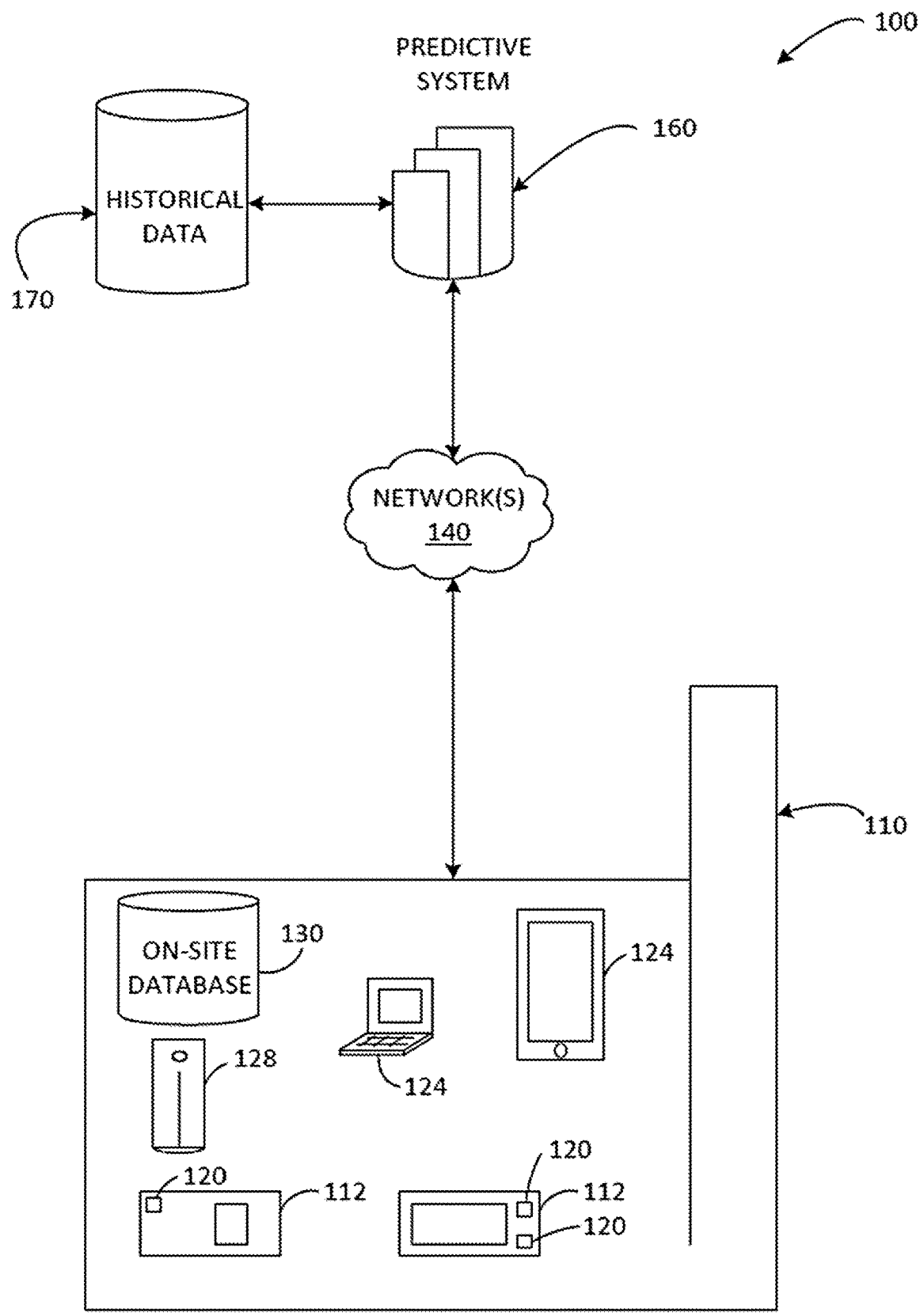
FIG. 1 is a simplified schematic diagram of an example of an environment comprising a predictive system in communication with an operating system, in accordance with various embodiments of the present disclosure.

Reference will now be made in detail to the description of the embodiments as illustrated in the drawings, wherein like reference numbers indicate like parts throughout the several views. In the following detailed description, reference is made to the accompanying drawings, which form a part hereof, and within which are shown by way of illustration certain embodiments by which the subject matter of this disclosure may be practiced. It is to be understood that other embodiments may be utilized and structural changes may be made without departing from the scope of the disclosure. In other words, illustrative embodiments and aspects are described below. But it will of course be appreciated that in the development of any such actual embodiment, numerous implementation-specific decisions must be made to achieve the developers' specific goals, such as compliance with system-related and business-related constraints, which may vary from one implementation to another. Moreover, it will be appreciated that such development effort might be complex and time-consuming, but would nevertheless be a routine undertaking for those of ordinary skill in the art having the benefit of this disclosure.

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Where ever the phrases "for example," "such as," "including" and the like are used herein, and variations of the phrase "and without limitation" is understood to follow unless explicitly stated otherwise.

The terms "comprising" and "including" and "involving" (and similarly "comprises" and "includes" and "involves") are used interchangeably and mean the same thing. Specifically, each of the terms is defined consistent with the common and applicable patent law definition of "comprising" and is therefore interpreted to be an open term meaning "at least the following" and is also interpreted not to exclude additional features, limitations, aspects, etc.

The term "substantially" (or alternatively "effectively") is meant to permit deviations from the descriptive term that don't negatively impact the intended purpose. Descriptive terms are implicitly understood to be modified by the word substantially, even if the term is not explicitly modified by the word substantially.

Disclosed herein are various examples related to dynamically adaptive modeling and prediction of one or more operational outcomes of interest, as described further herein. As used herein, groups of operating systems, hardware devices, machines and associated processes are also contemplated for monitoring of one or more operational outcomes of interest related thereto. Operating systems can include, but are not limited to, mobile systems or vehicles (e.g., locomotives, airplanes, etc.), industrial facilities or distributed equipment, or other monitored processing systems.

As used herein, "predictive analytics" refers to statistical analysis that uses operational feature data derived from one or a plurality of sources with an operating system, hardware device, or machine in need of monitoring, wherein such statistical analysis can be used to derive predictions about the probability that a future event, condition or operational parameter associated with the operation (or lack thereof) of an operating system, hardware device, or machine is likely to occur within a time period of interest in the future during operation thereof. In accordance with the inventions herein, probability models can be generated that will provide information to a system or a user (such as providing a signal generated within a system) that the operational outcome of interest is likely to occur.

The prediction methodology herein incorporates one or a plurality of statistical techniques to define the potential occurrence of an event or operational condition in need of monitoring. Included herein are methodologies for the prediction of a variety of predictions where a user would have need of predicting—that is, the "operational outcome of interest," which, in non-limiting examples include specific events (e.g., machine failure versus non-failure), maintenance signals (e.g., changes in operational parameters over time), classes of events (e.g., high, medium, or low production yield), resource utilization, operational costs and the detection of patterns within some data specific to some phenomenon (e.g., machine deterioration pattern) along with many others. Still further, the "operational outcome of interest" can comprise operational conditions including fault or failures, energy or resource use, production quantity or quality metrics, operational cost metrics, compliance with required performance metrics, or any other operational condition or outcome that might be of interest in operating systems, hardware devices, machines and associated processes.

In broad constructs, the present invention comprises systems and methods for automating the processes of accounting for dynamically changing contexts—that is, situations applying to the operating system, hardware device, or machine in need of monitoring—during operational conditions that may be changing or changeable between and among operations over periods of time. In this regard, the invention herein uses novel systems and methods to collect, contextualize and analyze a large amount of source data generated within and proximate to the operating system, hardware device, or machine to generate one or more probability models associated with the operating system, hardware device, or machine in real time or substantially real time.

A notable distinction between the systems and methods of the prior art is that the present invention provides automated processes to process and analyze vast quantities of operational data collected from or associated with operating systems, hardware devices, or machines during extended operation, as discussed in more detail herein. Such automation provides heretofore unavailable efficiencies in analyzing vast amounts of source data that is generated from today's complex operating systems, hardware devices, and machines. Moreover, the systems and methods herein are dynamic in that they are updateable as newly acquired operational data becomes incorporated as updated source data. The systems and methods are also able to automatically validate the generated predictive models prior to the application thereof so as to better ensure the applicability of one or more of the generated probability models to the operational data collected. Source data and/or context data values can be removed from use if they are not found to be currently relevant to the operation of the operating system, hardware device, or machine, and these source data and/or context data values can later be reincorporated for use if the context indicates that such information is again relevant to the operation. For example, the context data values relating to Summer months can be removed if it is Winter, but such information can re-incorporated when operation of the operating system, hardware device, or machine again happened in the Summer months. Yet further, the systems and methods are correctable in that a predictive model that previously has been found to be accurate can be removed when a subsequent modeling testing procedure applied to operational data collected over a period of time indicates that the predictive model is no longer accurate. In short, the systems and methods of the present invention are trainable (or "self-learning" or "self-modifying") in that they automatically test, discard and select predictive models to better ensure that the predictive models being applied in real time are accurate in relation to the operational conditions occurring at that time.

"Source data" comprises input data generated from or associated with operation of the operating system, hardware device, or machine in need of monitoring. Such source data can be derived from information obtained during the operation of the operating system as a whole, or it can comprise information that is specifically associated with one or more hardware devices or machines included with or associated with the operating system in need of monitoring.

In some embodiments, "source data" can be generated by or derived from one or more sensors associated with the operating system itself or with sensors associated with one or more hardware devices or machines that are themselves associated with the operating system. Still further, "source data" as used herein can be derived from information available from systems, situations or occurrences proximate to or associated with operation of the operating system, hardware device, or machine in need of monitoring. For example, "source data" can be derived from any Asset Management System (EAM), maintenance outputs (oil analysis, vibration, operational speed, run temperature, voltage etc.), employee training records, employee attendance records, safety incident reports, calendars (e.g., holiday occurrences), external weather, environmental temperature proximate to the operating system (such as the temperature of a facility or piece of equipment in which the operating system etc. is incorporated), recall or service reports for the operating system or any machine or device incorporated therein, or any other available data input from which information can be collected for sorting and analysis according to the inventions herein. When such information is related to past operations, it can comprise historical source data. Yet further, the operating system or user can be queried after generation of the prediction to generate a confirmation or validation that the predicted operational outcome of interest did occur (or did not occur), where such confirmation or validation can be input for use as source data to further improve the accuracy of the predictive models herein.

For example, one might have relevant data on motors (e.g., failure history) with a desire to predict the probability of motor failure within a 1-hour prediction window using source data from data sources associated with the hardware device or machine. Such prediction within a 1-hour window, or any other appropriate time window, can enable the machine or hardware device in which the motor is embedded to be taken off line for maintenance or to allow the motor or machine to be adjusted while in use, depending on the type of data being reported. If one or more sensors associated with the motor reports a high temperature reading, it may be prudent or even necessary to remove the motor from service, or it could be possible to slow the motor down in order to reduce the temperature, depending on the circumstances. Source data, can be obtained by recording on a periodic basis (e.g., once per hour) for each motor's average RPM, vibration, temperature, and amperage, for example. Source data can also include information derived from or developed in association with phenomena proximate with and related to the motor, the machine or hardware device in which is it embedded or the operating system in which it operates. In this regard, the source data can include environmental temperature, the condition of the area of which it is operating (e.g., the railroad tracks if it is a locomotive motor), information relevant to the person operating the machine (e.g., a train engineer), information relevant to the operating system itself (e.g., age of the train, number of cars pulled by the locomotive, maintenance records), and information about other machines or hardware devices associated with the operating system (e.g., motors or systems associated with other parts of the train being pulled by the locomotive motor). In short, the present invention enables a wide variety of seemingly disparate information to be used to generate prediction models so as to improve the ability to predict operational conditions of interest of an operating system, hardware device, or machine.

In some embodiments, the predictive model(s) derived from analysis of the source data generated during operation can be used to extract, learn or otherwise derive patterns and interplays between one or a plurality of feature data context values, as such term is defined herein, obtained while the operating system, hardware device, or machine is in operation over a period of time. As a result, predictions on operational conditions of interest following the analysis of the source data can be provided to a system or to a user for action upon. In one example, a failure or fault prediction can be provided for action thereupon so that the operating systems, hardware device or machine can be removed from service for maintenance associated with the predicted failure or fault parameter prior to the failure occurring. Alternatively, maintenance associated with the predicted operational parameter may be conducted, with the end result being that the predicted operational parameter will not occur, will be less likely to occur or can be made to occur.

In some embodiments, a prediction of an operational outcome of interest can be provided by way of a signal to an operator to instruct or otherwise notify him that the operating system, hardware device, or machine should be removed from service either immediately or in a short time thereafter. Yet further, a risk of the operational outcome occurring can be indicated. Alternatively, an operational condition prediction can be provided by way of a signal to an operator that the operation of the operating system, hardware device, or machine should be modified to affect the outcome of predicted operational condition. In further embodiments, an operational condition signal associated with a prediction can be utilized in a rules engine embedded in operational software that provides instructions for the operating system, hardware device, or machine.

In some embodiments, the systems and methods of the present invention show utility in predicting one or more of asset failure, asset health, operational conditions, and the compliance of asset operations. As a result, the systems and methods of the present invention can, in non-limiting examples, provide benefits such as reducing unplanned downtime and associated revenue losses, allow for repair of machines, cost reduction, production improvements, quality control, resource reduction for operating systems, hardware devices or machines prior to an operational outcome of interest event occurring, as well as providing insights into the causes of the outcome of interest in the first place.

In some embodiments, the systems and methods of the present invention combine data available in a system that has not previously been linked together and identifies which source data can provide improved benefits to the generating accurate predictive models that are accurate to address the current operating conditions of an operating system, hardware device, or machine. As such, the automated nature of the processes herein substantially eliminates subjectivity from the data and category selection process, thus providing a more objective and complete, and therefore more accurate, basis for predicting the likely occurrence of the operational outcome of interest.

Unlike existing predictive analytics solutions, the systems and methods of the present invention can automatically collect and, using a novel data contextualizing technique, allow a multitude of variations of the generated data to be analyzed to determine which form (or configuration) of the generated data provides optimized predictions regarding the future operation of the operating system, hardware device, or machine. Using the inventive systems and methods a plurality of different statistical approaches can be applied to the contextualized operational data very rapidly, with the result being the substantially accurate identification of the appropriate actionable solution or information for the given operating system, hardware device, or machine under the circumstances relevant during that operational period, that is, substantially in real time. The automation process is not trivial due to the fact that operational contexts relating to the source data change continuously and, therefore, the automated solution of the present invention must adapt to changing operational and environmental conditions on the fly—that is, in real time—and adjust both selected analyzed data and statistical technique/s accordingly in order to maximize accuracy for each predicted event in real time.

Still further, the predictive modeling systems of the present invention are dynamic and contextual so that the predictive model being applied at a particular time is correct when applied in context, that is, during the real time operational conditions of interest. In this regard, the systems and methods herein will enable collectable source data to be continually, or substantially continually, updated and contextualized for statistical analysis so as to generate updated predictions of the propensity of operating system, hardware device, or machine to experience an operational outcome of interest in a defined period of time thereafter during operation thereof. The generated one or more predictive models will then be self-modifiable or self-correctable when new operational data is generated from continued operation of the operating system, hardware device, or machine. The systems and methods of the present invention can allow automatic identification of improved and optimized combinations or transformations of collected source data so as to allow prediction of an operational outcome of interest before such outcome occurs to allow proactive steps to be taken to avoid or modify the occurrence thereof.

A notable feature of the systems and methods of the present invention is the incorporation of a source data contextualization step that dynamically selects the source data to address context changes that occur within the environment that the machine or hardware device of interest operates. Such contextualization can also be termed "configuration." For example, if the available source data comprises a machine oil temperature, the reading alone may not be enough to predict an engine's health within an actionable amount of lead-time to allow the machine to go off line for maintenance or for the situation to be addressed to prevent or eliminate the possibility of machine failure in advance. Instead, the available source data comprising the sensor-derived oil temperature information will be contextualized, that is, evaluated in conjunction with other aspects occurring within and proximate to the motor's operation in real time. This contextual information will be used to generate additional data context values for analysis that can be used to incorporate not just the single operational parameter of the motor—oil temperature in this example—but also other aspects in or associated with the operating system that are represented by or in varying context changes. In this regard, information comprising what is "normal" and "abnormal" for different assets, under different operating conditions, at varying stages of a maintenance cycle, operating at different locations, etc. is provided, or has previously been provided, to enable the oil temperature setting to be analyzed in context. Additionally, the data can be contextualized from the performance of one or more mathematical operations on the formatted data, such as, for example, by creating a data value that is the square root of the oil temperature. The multiple contexts in which the operational data can be provided for analysis greatly increases the quantity of parameters to which the plurality of statistical models can be applied, so as to magnify the ability to resolve the factor(s) that affect the future operation of the operating system, hardware device, or machine. In short, the present invention allows significantly more operational data to be evaluated in significantly more ways, even when the operational data is obtained from complex systems where the amount of data would otherwise greatly limit the ability to generate accurate predictive models using prior art systems. Moreover, the systems and methods of the present invention automatically determine whether newly contextualized information can be deployed to improve the performance of the prediction model. Thus, the methodology herein enables the predictions to be improved as more operational data becomes available over the period of time that the operating system, hardware device, or machine is in operation.

Moreover, the source data aggregation and contextualization steps of the present invention can allow raw source data from disparate sources to be inputted substantially as provided by the data source, be it sensor-based or any of the sources discussed elsewhere herein. In some embodiments, raw source data streamed from one or more sensors associated with the operating system, hardware device, or machine can be used. Batch data or other forms of data not generated from sensor sources can also be used. For example, data representing maintenance history (planned and unplanned), movement information/location, etc. may not be recorded at regular intervals. More specifically, the systems and methods herein can incorporate maintenance records generated regularly (e.g., hourly, weekly, etc.) while other sensor data may be delivered in real time or near-real time. In this instance, if predictions are to be generated at an interval shorter in duration than batch data are delivered, the solution can utilize substantially all data on hand and update the approach each time new data are incorporated and update the predictive output accordingly. Employee information, environmental conditions, or other forms of recorded information may be incorporated in spreadsheet form, for example.

In this regard, the systems and methods of the present invention can automatically select the optimum feature data context values to use in the statistical component of the process at any given time, where the feature data context values may differ between analyses of a single machine or hardware device or between different machines and hardware devices of the same type. The systems and methods of the present invention can allow generation of predictive models regarding outcomes of interest for a single operating system, hardware device, or machine, that is, the predictive models can be customized. In other words, the systems and methods of the present invention can allow predictive models to be generated from source data that emanates from an operating system, hardware device, or machine, where the source data is specific thereto.

In accordance with the methodology herein, a plurality of alternative modeling approaches can automatically be run in the background, and the source data can be tested to determine which of the generated predictive models are most accurate for deployment at that time (or that will be most accurate for some defined time in the future) for the operational outcome of interest. The accuracy of the resulting predictions is thus improved by use of this automated self-testing step.

As an example of the context change embodiment of the present invention, the different operation of two ostensibly identical machines, denoted "System 1" and "System 2," can be addressed to obtain real time condition information relevant specifically to each machine. In many situations, such ostensibly identical machines will function differently in substantial aspects when in use. For example, System 1 may normally run hotter and vibrate more than System 2. Prior art predictive analyses techniques that use standard operational parameters, such as anomaly detection or rules based systems, may signal a failure is likely from System 1, even though it is not subject to failure because of its specific operational parameters. In some embodiments, the present invention provides information derived from statistical analysis of a plurality of feature data contexts associated with a single machine or hardware device in need of monitoring, where such statistical analysis can be used to predict the likely operational outcomes related to or associated with the specifically analyzed machine or hardware device.

Referring now to FIG. 1, shown is a simplified schematic diagram of an environment 100 having an operating system 110 such as, e.g., a manufacturing setting or a mobile system (in one aspect, a train, for example) with one or more piece(s) of equipment 112 (e.g., a hardware device and/or machine) on which processes may be performed for various purposes such as, for example, processing, manufacturing, transportation, providing services, or the like. The operating system 110 can further include one or more sensors 120 that can be used to collect operational data on any suitable aspect of the operating system 110, equipment 112, environment 100, product and/or unfinished product (e.g., in-situ production samples, work-in-progress, etc.) during operation thereof. Such one or more sensors 120 generate source data that can be used to provide source data for analysis as discussed elsewhere herein.

The one or more sensors 120 can each, independently, be any suitable sensor including, for example, thermometers, hygrometers, pressure sensors, flow meters, vibration sensors, odometers, accelerometers, ammeters, voltmeters, power meters, digital multi-meters, digital imagers, microscopes, distance measurement devices, tackiness detectors, rigidity detectors, stiffness detectors, alignment detectors, pH detectors, GPS locators, combinations thereof, or the like.

Source data generated by these one or more sensors 120 will be associated with the specific past or current operation of the equipment 112 that operates within the operating system 110 or processes associated therewith. For example, if the one or plurality of sensor(s) comprises a temperature sensor, data will be generated related to temperature readings or behavior of equipment 112 (e.g., a machine or hardware device) with which that one or more sensors 120 is associated will be generated during operation thereof. Moreover, each of the one or more sensors 120 can have multiple functionalities so as to generate multiple sets of source data, or one or more sensors 120 can generate a single set of source data that provides information about multiple operating parameters of the equipment 112 with which the one or more sensors 120 is associated. In this regard, the one or more sensors 120 can be configured to provide both temperature and vibration information, for example, where the temperature and vibration information can be streamed as separate source data outputs (i.e., temperature data and vibration data), or the information can be combined to provide a unique source data parameter that incorporates both temperature and vibration data into a single source data component for analysis according to the methodology herein.

The one or more sensor(s) 120, in part, provide the historical and operational information that provides the source data that is at least collected, contextualized, and analyzed according to the methodology herein. Each piece of equipment 112 can be associated with one or more sensors 120, each of which provides source data relevant to one or more features of the operation of equipment 112 thereof. Alternatively, or in addition to, the operating system 110 can itself be associated with one or more sensors 120, whereby data regarding the overall operation of the operating system 110 can be generated for analysis in accordance with the methodology herein.

Each of the one or more sensors 120, in various embodiments, can each, independently, be coupled to one or more controller(s) and/or user device(s) 124 that can receive sensor measurements (e.g., raw measurement data from one or more pieces of equipment 112), derive additional information therefrom, and/or provide the source data and/or additional information to an on-site server or master controller 128 that can store and/or archive the data to provide, for example, source data for analysis in, e.g., an on-site database 130. Additional information can also be stored and/or archived as for use as source data in the database 130.

The user devices 124 can be any suitable communications device including, but not limited to, desktop computers, tablet computing devices, electronic book (e-book) readers, netbook computers, notebook computers, laptop computers, personal digital assistants (PDA), smart phones, web-enabled televisions, video game consoles, set top boxes (STB), digital video recorder (DVR) systems, wearable user devices, combinations thereof, or the like. The user devices 124 can be used by users, such as an operator in the operating system 110, for a variety of purposes including, but not limited to, performing processing tasks and/or accessing one or more networks, such as the Internet, local area networks (LANs), wide area networks (WANs), or the like. Controllers 124 can be any suitable computing or processing device configured to perform processing tasks, control operation of equipment, and/or access the one or more networks. In particular, the user device(s) and/or controller(s) 124 can be configured to process and/or transmit source data, as can be collected from one or more sensors 120, generate logs or other information pertaining to equipment 112 or processes running thereon or associated therewith, and/or interfacing with one or more other user device and/or controller 124, the on-site server 128, and/or a predictive system 160. The user device(s) and/or controller(s) 124 can further be configured to process and/or transmit historical source data or other types of that is generated from non-sensor sources, such as records etc., as discussed in more detail herein.

The user device(s) and/or controller(s) 124, in addition to facilitating local storage of source data, can be configured to provide additional information and/or source data associated with the processes, operating conditions and/or equipment 112 associated with the environment 100. Data and/or readings entered or recorded by an operator, as well as aggregations and/or combinations of sensor data, can be collected and/or derived via the user device(s) and/or controller(s) 124 and transmitted to the on-site server or master controller 128 and/or stored in an on-site database 130. Such additional information can comprise historical source data or operational data or system/user input data as appropriate in the inventions herein. For example, readings recorded by an operator during operation of the operating system, hardware device, or machine can be incorporated as source for current analysis herein if the data is analyzable in real time. Similarly, such entered readings can comprise historical source data if they are stored for later analysis.

Maintenance records can provide a relevant source of data that may not be available and generally is stored separately from sensor data. This information can be entered using, e.g., a user device 124, on-site server 128, or other networked device. For example, maintenance data can be entered manually or using a device by a user for use as source data in substantially real time, or it can be captured in an image that can be converted and formatted for use as historical source data. Such data can also be incorporated from spreadsheets, data tables etc. Telemetric data can also be provided for use.

In various embodiments, the user device(s)/controller(s) 124, a subset of user device(s)/controller(s) 124, and/or the on-site server/master controller 128 can be configured to receive information, such as from the remote predictive system 160, of an impending operational condition of interest of the operating system 110, one of the equipment 112, or processes of the environment 100. This information about an impending operational condition of interest may be determined by the predictive system 160 by employing the systems and methods described herein. The indication of an impending and/or relatively likely operational condition of interest may be used by operators and or other entities (e.g., automated control entities, such as the user device(s)/controller(s) 124 and/or the on-site server/master controller 128) in adjusting equipment 112 and/or system or process parameters to prevent, reduce the likelihood, and/or more promptly react to the impending and/or relatively likely operational condition of interest.

The controller(s)/user device(s) 124 and/or the master controller/on-site server 128 can be configured to communicate with the predictive system(s) 160, in accordance with various embodiments of the disclosure. The controller(s)/user device(s) 124 and/or the master controller/on-site server 128 can be configured to provide source data, such as system, equipment, environmental or process related data, from one or more on-site database(s) 130, to the predictive system 160 via one or more network(s) 140. In some embodiments, the system, equipment and/or process data can be retrieved by the predictive system 160 via the network(s) 140. The predictive system 160 can further be configured to store the sensor data and other data sources in, e.g., a historical source database 170. In some embodiments, the historical source database 170 can be co-located with or remotely located from the predictive system 160. In various embodiments, the predictive system 160 and the historical source database 170 can be remotely located from the operating system 110 or otherwise at a location where systems and/or processes are being monitored. The predictive system 160 can, therefore, receive and/or retrieve system, process, equipment and/or other data from the on-site database 130 via the network 140 facilitated by one or more other entities at the operating system 110 in various embodiments. In alternative embodiments, the predictive system 160 can be substantially co-located with the equipment 112 being.

Although the one or more sensors 120 are described herein and the source data obtained from them can be used along with other non-sensor based data sources by methods and systems described in the present disclosure to provide operational condition of interest prediction capability, it will be appreciated that the one or more sensors 120 and/or additional data collected via the controller(s) and/or user device(s) 124 can be the same data that would otherwise be collected from the equipment 112 and processed without implementing the systems and methods described herein, in some embodiments. That is, the data can comprise standard sensor data outputs as generated in the operation of the operating system, hardware device, or machine. In other embodiments, one or more additional one or more sensors 120 beyond what may normally be used for process monitoring can be added to enable data collection to generate source data. That is, the operating system, hardware device, or machine can be configured to generate source data specifically for use in the inventions herein. In either case, there may be any variety of data that can be collected for use as source data using the one or more sensors 120, controller(s) 124, user device(s) 124, and/or other mechanisms described herein, that may collectable and available for use by the predictive system 160 for operational condition of interest prediction. This can include maintenance data, telemetric data, user/system input data and other information that is collected during the life of the operating system 110 and that is associable therewith.

In the various embodiments where the operational condition detection and the predictive system 160 associated therewith can comprise one or more server(s), is in the cloud or otherwise remote to the operating system 110, the data and/or information transfer between the predictive system 160 and other entities of the operating system 110 can be via the network(s) 140 or other suitable communicative links. The networks 140 can include any one or a combination of different types of suitable communications networks, such as cable networks, the Internet, wireless networks, cellular networks, and other private and/or public networks. Furthermore, the networks 140 can include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof. It is also noted that the described techniques may apply in other client/server arrangements, as well as in non-client/server arrangements (e.g., locally stored software applications, etc.).

FIG. 2A graphically illustrates how the predictive system 160 can autonomously learn to account for dynamically changing contexts during operation of the operating system, hardware device, or machine. The systems and methods of the present disclosure are self-learning, self-correcting and dynamically updateable to take into consideration changes that can affect the operation of the operating system, hardware device, or machine. As illustrated, raw data can be collected and formatted for use as source data which can be contextualized and analyzed. Features can be dynamically discovered and generated from the formatted source data. Evaluation of the features allows feature data context values to be dynamically selected to update probability models as the environment or monitored data changes during operation. Validation of the probability models can be used for selection of the most relevant models for deployment in the prediction of the operational outcome of interest. In short, the systems and methods of the present disclosure are trainable (or "self-learning" or "self-modifying") in that they automatically test and update predictive models to better ensure that the predictive models being applied in real time are accurate in relation to the operational conditions occurring at that time.

In order to provide for the generation and deployment of dynamically updated and updatable predictive models used by the predictive system 160, feature discovery and runtime processes can be executed in parallel or concurrently by the predictive system 160. The feature discovery process, that is, the components of the feature data contextualization as described elsewhere herein, utilizes source data obtained from the one or more sensors 120, as well as other sources of data that may provide relevant information about the operational parameters of equipment 112 or operating system 110 in part or in whole (e.g., maintenance records, movement, position, etc.) to identify data features and overall feature data contexts that can enhance the ability of the runtime operations to predict the likelihood of a operational condition of interest occurring in the operating system 110, equipment 112, or in a process being carried out that is associated with the operating system 110 or equipment 112. The runtime process utilizes the identified feature data contextualizations to generate runtime data sets and create predictive models, which can then be utilized to provide predictive results based upon the runtime data sets generated therefrom.

Separately, the feature discovery process utilizes source data derived or otherwise obtained from the operating system 110 to create or identify feature contexts, determine scores for the feature contexts with respect to the likelihood of an operational outcome of interest occurring, and update the feature data context values based upon the determined feature scores. The feature data contexts (which can also be termed "data configurations" or "feature configurations"), in some embodiments, can be updated on a predefined schedule such as, e.g., after a defined number of feature scores have been evaluated. The runtime process can update the runtime data sets based upon the updated feature data context(s) and generate new predictive models using the updated runtime data sets. Updating the feature data contexts can allow the predictive models to dynamically change over time to account for information that will be generated during additional operation of the operating system, hardware device, or machine.

Figure 2B:
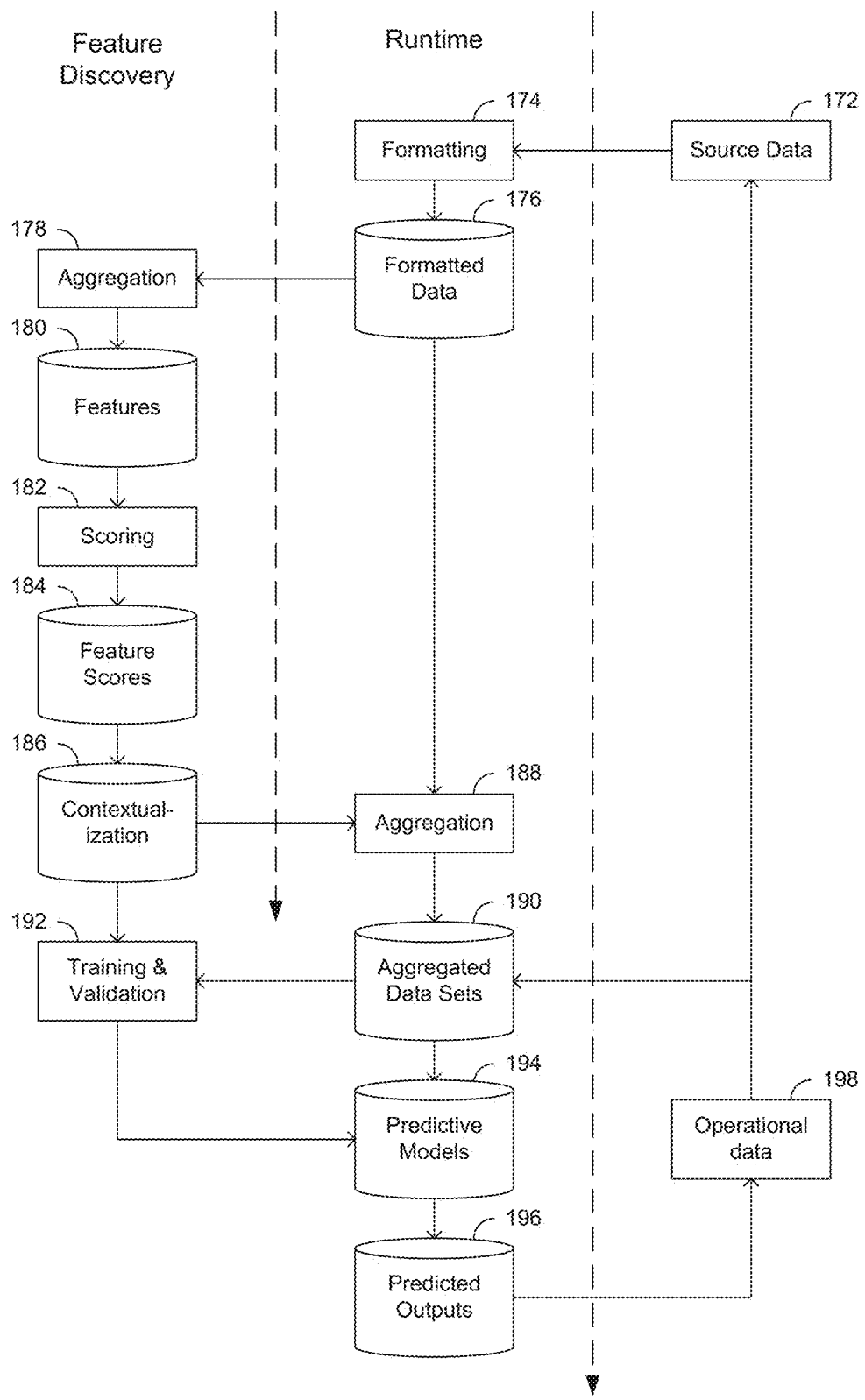

FIG. 2B illustrates an example of the operation of the feature discovery and runtime processes, as executed on the predictive system 160 of FIG. 1. Source data 172 or other data received by the predictive system 160 from the operating system 110 (FIG. 1) is formatted 174 by the runtime process for use. The source data 172 can include values, numeric data or other historical and operational information related to the environment 100 and operating system 110 that was received by the predictive system 160. While the raw data collected often includes temporal series of values or numeric data (e.g., from one or more sensors 120 located about the system 110 taken over time, the raw data collected can also include sets of values or numeric data that are spatially related or are related to a piece of equipment or group of equipment. The raw data can include identification of the corresponding equipment 112 of the operating system 110 (FIG. 1), in addition to a continuous measure for organizing the series (e.g., a timestamp, mileage, location, etc.), and/or whether another input (e.g., maintenance) or outcome of interest had occurred. Formatting 174 will condition the source data 172 for further use by the feature discovery and runtime processes. For example, the as-received source data can be scaled or normalized as appropriate for subsequent use as source data for use in generating predictive models. The formatted source data 176 can then be stored as historical source data (e.g., in a central data store of the predictive system 160 and/or the historical source database 170 of FIG. 1) for use in both the feature discovery and runtime processes.

The feature discovery process is an asynchronous operation that continuously examines the unbounded search space of the formatted source data 176 to determine new features that may best represent contexts preceding and correlated with, or causing, an operational outcome of interest associated with the operating system 110 or equipment 112 or process associated therewith. A feature can be a single numeric value that provides an aggregated representation of some aspect of the source data 172. In order to discover those features that may be best suited to predict the likelihood of the occurrence of the operational condition that is the outcome of interest, in a recurring solution, three steps can be performed by the feature discovery process: feature creation, feature scoring and feature selection. For example, the source data 172 can include a time series of temperature readings associated with a piece of equipment 112 or process condition of the operating system 110, which has been formatted for processing. The aggregator can be a defined transformation (e.g., a mathematical and/or logical relationship) that transforms/configures the formatted source data 176 into a corresponding feature. The formatted source data 176, can be searched to create the feature 180. For example, a bounded random search can be used to iteratively search the space for features.

There is no limit to potential contexts that one can account for using the aggregator, provided that source data 172 are available, especially given the automated nature of the present invention. In many cases, there are contexts that may deeply impact the predictive model results, whether directly, or by representing a proxy for some unmeasured construct. In this regard, the contexts of the feature can vary across three primary sub-contexts:

Temporal contexts;
Spatial (geographical location) contexts; and
Group contexts, which includes both individual contexts (e.g., an individual machine's developmental profile) and homogenous group contexts (e.g., a group of similar machines).

Within each of these sub-context approaches, variables may be modified based on their own context (i.e., univariate), or on influence from other covariates. Provided quality source data 172 are available, the possibilities around context accountability are virtually limitless, yet too many options can be quite burdensome to analyze in practice. That is, existing predictive models cannot automatically contextualize input data and, as such, are limited in the scope and content of the resulting operational parameters that can be analyzed for their effect on the operations of the operating system, hardware device, or machine. The inventive solution described herein can be scaled across an expanse of possibilities, starting with base logic keys that represent defined context situations that are uniquely temporal, spatial, or group-based, or are some combination of time, space, and/or group contexts and therefore specific to the operating system, hardware device, or machine where the operation thereof is of interest.

Within the prediction of continuously developing processes, the core of context accountability can be driven primarily by temporal development. Individual data points representing a system or piece of equipment's history, current state, a metric for an expected future state, and combinations thereof can represent this temporal dynamic. A multivariate take may account for temporal contexts of interactions between two or more unique raw metrics, or features. Furthermore, instrumental variables tapping into causal relationships (e.g., multistage equations) of the features themselves may also be contextualized temporally. Whether univariate or multivariate, a variable may be temporally contextualized by its expected future state (e.g., relying on past-states to predict the future state of a feature).

Spatial contexts can also be considered and capitalized upon in a similar fashion. For instance, the effect of a temporally contextualized feature may not apply equally across all physical locations. Geography, or physical location, may moderate, or mediate, an input's correlation with other inputs or with the output itself. Therefore, spatial contexts can be considered in parallel. Spatial contexts may be considered secondary to temporal contexts because they may not always apply (e.g., a system's operating environment may be fixed in location). As an example, the standard deviation of a temperature reading within a given location (e.g., some geographic polygon) would represent a spatially contextualized feature. More complex features can include those that can be contextualized by both time and space simultaneously. For example, the difference between the current temperature reading and the standard deviation of the temperature for all observations on record within a particular machine during warm calendar months can be incorporated into the methodology, such as by including the values as derived during operation of the operating system, hardware device, or machine being monitored, to improve the accuracy of the predictive models to predict the likelihood of an operational event of interest occurring in the future, where such accuracy is specific in relation to the operating system, hardware device, or machine being monitored.

The context of individual-variation and group-variation can be assessed relative to an individual system or piece of equipment's history, or compared to that of similar systems or equipment, exposed to similar contexts (i.e., compared to the group). From this, it can be seen that the potential features across multiple contexts will grow. There is substantially no limit on the granularity of temporal contextualization or upon spatial contextualization of source data values using the systems and methods herein. New features can be developed around a vast dynamic of context related to the operation of the operating system 110 or equipment 112 therein, where the potential contribution can be assessed, and meaningful features can be identified with the ultimate goal of contributing contexts by way of analyzing operational data in the form of context data values that best apply for predicting the operational outcome of interest under the circumstances relevant at that time or within a time period that is of interest, such as about 15 minutes, about 30 minutes, about 1 hour or about 2 hours, etc.

An example of a feature that accounts for each of the aforementioned context categories can be illustrated by the following scenario. As applied to distributed mobile assets (e.g., trains, trucks, aircraft, spacecraft, watercraft, or other transport vehicles) that are subject to unplanned downtime while in the field, many contexts can be drawn from an individual data reading. For example, engine oil pressure can be considered. A reading for oil pressure can be transformed (or "contextualized") into a feature or metric of relative variation based on the number of occurrences in the month preceding the observational record (a temporal context), where the asset's oil pressure dropped below the fleet average (a group context) while passing through a specified geographic region (a spatial context) during the same time of a calendar year (another temporal context). This source data 172 can also be used to define a variety of features with univariate contexts (e.g., the number of occurrences in the past month, within a specified location, where the oil pressure dropped below a threshold) or with other multivariate contexts (e.g., when the oil pressure falls outside of a range about the nominal oil pressure for the unit or for the fleet). Subsequent features from the equivalent origin can also be created, and those features can be incorporated into the source data 172. For example, instead of measuring context variation relative to the fleet's experience, the variation could be compared to the individual asset's history for the same location and same time of year. Performance metrics associated with personnel involved with the operation of the operating system, hardware device, or machine can also be included as source data 172. The possible features that can be generated from the operation of an operating system, hardware device, or machine are substantially endless, based upon the amount and types of data that are available for aggregation 178. As can be seen, a wide variety of features 180 can be defined using the same source data 172.

Aggregation 178 is carried out during the feature discovery process using the formatted source data 176 to generate the features 180 for scoring 182. An aggregator can be defined to create a feature 180 from the formatted source data 176. In the case of a temperature series, the aggregation 178 can be defined to determine, e.g., the mean temperature for a defined period of time or the temperature swing (or variation) during the defined period. In other implementations, the aggregator can determine the amount of time (or percentage of time) that the temperature exceeded or remained below a defined threshold. Other relationships can be defined as can be understood. The feature 180 is aggregated 178 from the formatted source data 176. The feature 180 can be fully characterized by the formatted source data 176 that was used, the range of the data (e.g., a time range such as the past month, a one-week range starting two weeks ago, etc.), and/or a set of hyper-parameters (e.g., thresholds, coefficients, weights, etc.). In this way, a finite set of source data 172 can be used to create a nearly infinite set of features for evaluation, if such is appropriate under the circumstances.

The generated features 180 are scored 182 to identify a reduced or smallest set of features that can be used to predict the operational outcome of interest. Scoring 182 of the features 180 can be accomplished univariately, which allows for massive parallelism, and facilitates searching over many orders of magnitude more features than traditional methods. This type of scoring 182 also enables the feature discovery process to be not just a one-time-only batch process, but to be an asynchronous, online operation. To obtain a more robust feature score despite the univariate analysis, an ensemble of scorers can be used. The feature scores 184 (and the feature definition) can be stored as operational information (e.g., in a central data store of the predictive system 160 and/or the historical source database 170) and used for feature selection to generate or update the feature configuration for an operational outcome of interest in the operating system 110 or for equipment 112 incorporated therein.

Features 180 may be scored 182 in a number of ways, but, for example, can be broken into two primary categories, which may be referred to as "absolute univariate" and "relative mini-batched." For an absolute univariate approach, a single feature 180 is scored in terms of its absolute usefulness by itself in predicting an operational outcome of interest. Examples of absolute univariate scoring include, but are not limited to, determination of variance, correlation coefficients, and scoring with a model trained on only that single feature. In contrast, a relative mini-batched approach incorporates a small number of features 180 (e.g., ten or less) and ranks them against each other. Their performance relative to each other can be used to update their global scores. The relative mini-batched approach can be generated using, e.g., average rankings, average scores, Elo scoring, or other appropriate ranking method. Multiple different scores (or rankings) can be determined for the features 180, and used individually or in combination to evaluate the ability of features 180 to facilitate prediction of an operational outcome of interest. The feature scores 184 can be stored (e.g., in a central data store of the predictive system 160 and/or the historical source database 170) for subsequent determination of one or more contextualizations 186. Such complex mathematical operations are uniquely possible with the inventive systems and methods herein.

In a novel aspect, the feature discovery process autonomously searches for new and helpful features that can be used in the prediction of the outcome of interest. When a feature is found with a score 184 that satisfies the specification of the contextualization 186 for the outcome of interest (e.g., within a defined number of top scoring features such as, e.g., within the top 100 feature scores), it can then be used to generate an initial contextualization 186 or update an existing contextualization 186. The contextualizations 186 can be stored (e.g., in a central data store of the predictive system 160 and/or the historical source database 170) for later access. The feature discovery process will eventually exhaust or substantially exhaust the number of possible features. At such time, the feature discovery process can be restarted using newly acquired source data (e.g., that data obtained from continued operation of the operating system, hardware device, or machine) to update the previously generated feature scores 184. This allows the original scores to be updated, which can result in previously selected features being eliminated and replaced with previously unselected features. In other words, the systems and methods of the present invention are self-learning, self-correcting and dynamically updateable to take into consideration changes that can affect the operation of the specific operating system 110 or the equipment 112 in use. In addition, new source data 172 may be considered and new features defined. The feature discovery process can thus adapt to changing physical phenomena in the problem space by re-evaluating feature scores on new historical source data as it becomes available.

The contextualization 186 can be used by the runtime process to generate new predictive models 194 based on the features identified in the contextualization 186. Even though the scores 184 correspond to a specific feature 180, the predictive models 194 can use the features 180 in a multivariate fashion. In this regard, the runtime process aggregates 188 the formatted source data 176 based upon the features defined by the contextualization 186 to generate an aggregated data set 190 including feature data context values, which is used to generate the models 194 and predicted outputs 196 for the outcome of interest for the operating system 110. The predictive models 194 are based upon the determined contextualization 186 and trained 192 using data from the aggregated data set 190.

Different models and/or classifiers 194 can be trained 192 in different ways, whether it is supervised, unsupervised or semi-supervised learning, as such terms are known to those of skill in the art. Examples of training methods include, but are not limited to, stochastic gradient descent, ordinary least squares, and genetic algorithms. Testing and validation 192 are carried out on the trained predictive models 194 to determine the effectiveness of the generated models 194. Training/testing protocols for individual classification models generally do not vary within a particular aggregation context (e.g., calendar time interval, distance interval, operational hours interval). Validation 192 can be used to determine whether a predictive model 194 that is currently being used should be replaced with the predictive model 194 that is based on the new contextualization 186 training (which, as would be recognized, has now been updated to account for additional operational information generated from the operating system 110 and/or equipment 112). If the validation indicates that the performance of the newly trained predictive model 194 is better for predicting the operational outcome of interest than the predictive model 194 currently in use, this validation can be used as a basis for deploying the newly trained predictive model 194 to replace the predictive model 194 that is currently being used. The predictive models 194 can be stored (e.g., in a central data store of the predictive system 160 and/or the historical source database 170) and used to determine the predicted outputs 196 for the outcome of interest using current operational data from the aggregated data set 190. In some implementations, more than one predictive model 194 may be used to evaluate the aggregated data set 190 and provide predictive outputs 196 for an operational outcome of interest.

The predicted outputs 196 of the trained models 194 can be sent to users and/or operators of the operating system 110 (FIG. 1) or to other entities such as, e.g., centralized or local operational centers associated with the operating system 110 for appropriate action. For example, if the predicted output 196 indicates that an operational outcome of interest (e.g., a failure of a component or piece of equipment 112 of the operating system 110 or other operational condition of interest) is likely to occur within an indicated period of time, then the user and/or operators may take action to avoid or modify the occurrence of the operational outcome of interest. The action may correct or modify a condition through, e.g., maintenance, repair or replacement of the component or equipment 112. As a result, operational data 198 such as, e.g., maintenance logs, replacement or repair records, wear or test measurements, energy or resource usage, or an indication of whether and to what extent the outcome of interest occurred can be entered or recorded by the user and/or operator. The operational data 198 can be submitted as source data 172 for subsequent consideration by the feature discovery process so as to provide an aggregated data set 190. For example, maintenance/repair evaluations and performance results from one or more actual prediction output 196 (e.g., whether the prediction was right or a condition existed that could have resulted in the outcome of interest) can be used to define and/or produce features 180.

In addition, the operational data 198 can be included as part of the aggregated data set 190 and used to train and validate 192 the predictive models 194. The results provided in the operational data 198 (e.g., the performance results from one or more actual prediction output 196) can be used with the aggregated data set 190 to further train the predictive model 194 and improve the accuracy of the predicted outputs 196. The operational data 198 can also provide valuable information regarding a predicted outcome of interest that can be used during validation. As newly acquired operational data 198 become available as aggregated data set 190, the stored and current predictive models 194 can be revalidated to determine which is the most effective at predicting the outcome of interest. In this way, the predictive system 160 can autonomously adjust for changing conditions of the operating system 110. If it is found that the current predictive model 194 is outperformed by one of the other predictive models 194, the predictive system 160 can dynamically update the predictive model 194 to provide the most effective prediction outputs 196 regarding the outcome of interest. In some cases, the validation may indicate that more than one predictive model 194 should be used to provide predictive outputs 196 for an operational outcome of interest.

In some embodiments, the predicted outputs 196 of the trained models 194 can be sent to the master controller/on-site server 128 and/or to controller(s)/user device(s) 124 of the operating system 110 (FIG. 1). The master controller/on-site server 128 and/or controller(s)/user device(s) 124 can be configured to take specific actions (e.g., corrective actions or other modifications) in response to the predicted outputs 196. For example, if the predicted output 196 indicates that a component or piece of equipment 112 of the operating system 110 will be overloaded or operating outside of allowable limits, the master controller/on-site server 128 can automatically adjust the load or other operational parameter of the component or equipment 112 to avoid the predicted output 196. In addition, the master controller/on-site server 128 and/or the controller(s)/user device(s) 124 can collect data from sensor(s) 129 (FIG. 1) or other operational information in response to the predicted output 196 and/or as part of the specific actions. For instance, a defined set of operational data 198 may be collected for a defined period of time after the predicted output 196 is received by the master controller/on-site server 128 and added to source data 172 to provide updated aggregated data to the data set 190. The aggregated data set 190 can be used to reevaluate and/or confirm the likelihood of the outcome of interest using the predictive models 194. Users or operating systems can also be queried at a period of time after generation of the predicted output 196 to obtain a confirmation that the predicted operational outcome of interest did (or did not) occur. The user/system response can be used as source data 172 to further improve the accuracy of the predictive models 194 in the prediction of future operational outcomes of interest.

If the feature discovery process identifies a new feature 180 and updates the contextualization 186 to include that feature 180, it can trigger the runtime process to update the aggregated data set 190 based upon the revised contextualization 186. For example, the current and previous values for the new feature 180 can be added to the aggregated data set 190 from the formatted source data 176. Feature data context values include feature data having at least one contextual relationship. In addition, feature data context values for a feature 180 that has been removed from the contextualization 186 can be removed from the aggregated data set 190. When predictions are next run to determine the predicted output 196, the predictive models 194 can be re-trained 192 using the new feature data context values from the updated source data set 172, which further generates new models 194 that can produce better predictive results. Such removed data or associated feature data context values can be re-incorporated if operational context indicates that such information is again relevant to assessing the probability of the outcome of interest occurring.

With the feature data context values of the aggregated data set 190 being dynamically updated by the autonomous feature discovery process, a dynamic modeling method can be used to ensure that the modeling techniques used remain appropriate and most accurate for the changing data contexts that occur during continued operation of the operating system 110 or equipment 112. In order to accomplish this, a broadly stacked ensemble of different strong classifiers (or statistical models) based upon the determined configurations can be used as sub-models, and combined with a super-model for accurate prediction of the outcome of interest. For example, the sub-model classifier outputs can be evaluated using a super-model to make the determination. A plurality of varying machine learning models or classifiers can be trained in parallel based on the contextualization 186 for use as the sub-models. In practice, the aggregated data set 190 may be pre-processed such as, e.g., normalization, scaling, missing data imputation, whitening, dimensionality reduction, kernel methods, manifold learning, and/or clustering, for use by the machine learning models or classifiers.

In some embodiments, the outputs of the trained sub-models can be combined as a prediction output dataset that the super-model subsequently utilizes as an input set to produce the final prediction output 194 for the outcome of interest. The super-model can serve as the supervisory model, that is the "judge," to allow the selection of the sub-model or combination of sub-models that perform best at modeling the outcome of interest, to produce a final consolidated predicted output 196 having substantially the highest utility. Using this technique, a set of model specifications can be identified that adapt to produce the final predicted output values based on what is performing best on the constantly changing input data, at any given time.

Training of the predictive models 194 can be carried out prior to or in parallel with the generation of the predictive outputs 196 using the trained predictive models 194. A first training method comprises a train and run (train/run) process, which is implemented by first training 192 the predictive models 194 as described above, followed by use of the aggregated data set 190 and newly trained models 194 to determine the predicted outputs 196. A second training method can comprise a train and push (train/push) process, which is implemented by first training 192 new predictive models 194 as described above, followed by "pushing" the new predictive models 194 into storage (e.g., in a central data store of the predictive system 160 and/or the historical source database 170). The train/push process can be followed by a pull and run (pull/run) process, where the stored predictive models 194 are retrieved from storage any time after training 192 is completed and used with the aggregated data set 190 to determine the predictive outputs 196.

This combination of the train/push process and the pull/run process disconnects the training of the trained predictive models 194 from the actual use of the trained predictive models 194, allowing the training 192 to be carried out independently from the generation of the predictive outputs 196. Training 192 of the predictive models 194 can thus be carried out concurrently with the use of previously trained predictive models 194 to determine the predicted outputs 196. In some implementations, the train/push process can be scheduled to take place during times when the processing needs of the predictive system 160 (FIG. 1) are reduced. For example, this can generally occur during the early morning hours (e.g., 1 am to 5 am) when most normal business operations are not taking place. When it is time to update the older predictive models 194 with the newly trained models 194, the pull/run process can retrieve the new predictive models 194 and begin using them to determine the predicted outputs 196.

The predictive system 160 (FIG. 1) may be configured to receive source data 172 and store the data in the historical source database 170 (FIG. 1). The historical source database 170 may be used to archive pertinent data for any suitable time period. An extraction, transform, and load (ETL) process may be performed, in various embodiments, by the predictive system 160 to properly format and store relevant data in the historical source database 170 for subsequent use in generating and/or updating the prediction models 194 (e.g., fault prediction models) of FIG. 2B. The data may be evaluated, filtered, and/or cleaned by the predictive system 160 to remove any data that may be spurious in nature (e.g., relatively noisy, incorrectly measured, false readings, missing entries, or otherwise not likely representative of the systems and processes being measured). In other words, the predictive system 160 may filter out bad data from the source data 172 that may be, at times, provided by operation of the operating system 110 and/or equipment 112 and processes being measured. In various embodiments, any suitable mechanism may be employed to filter the source data 172 that may subsequently be used by the predictive system 160 to generate the predicting sub-models, such as, for example, a set of heuristic rules. Such heuristic rules, for example, may discard data that has a change (e.g., immediate delta or averaged delta) from a previous and/or subsequent data point in a time series of that parameter data that exceeds a threshold change level. Indeed, other mechanisms for identifying spurious data, such as relatively wide swings over time, jitter, filtered noise, or inconsistent correspondence with other parameter data, may be used to filter and clean up sensor data that is to be used for model generation and/or updating.

After the received and/or retrieved data is filtered, the predictive system 160 may be configured to train the sub-models and the super-models that combine the outputs of the sub-models using various weights and/or parameters for the purposes of predicting any variety of operational outcomes of interest that may be associated with the operating system 110 or equipment 112 or processes associated therewith. The sub-models can be any suitable type of model (e.g., statistical models) for predicting an operational condition of interest from the source data 172. In this training phase (e.g., pre-deployment phase), a variety of sub-models may be generated based at least in part on feature data context values comprising source data 172 having at least one contextual relationship, as may be available to the predictive system 160 from the historical source database 170. The sub-models may be generated based not only on the feature data context values aggregated 188 from the source data 172, but also based on historical knowledge of the occurrence of the likelihood of occurrence of the operational outcomes of interest that may have occurred that are to be predicted using the sub-models. Such knowledge may be based at least in part upon operational data 198 (FIG. 2B) that is obtained in response to predicted outputs 196 (FIG. 2B).

The sub-models may comprise any suitable type of model or predictive analytics, such as regression models, random trees, random forests, naïve Bayes, decision trees, support vector machines, logistic regression, probit regression, combinations thereof, or the like. In some embodiments, at least two operational outcome-predicting sub-models may be generated and combined as inputs to the super-model. In other embodiments, more than two operational outcome predicting sub-models may be generated and combined to supply the super-model. In yet further embodiments, five or more operational outcome predicting sub-models may be generated and combined to provide inputs to the super-model. In various embodiments, principal component analysis (PCA) can be performed to determine what source data 172 may be the most pertinent to the generation of the operational outcome predicting sub-models. In some embodiments, the sub-models may be generated in a manner where only a subset of parameters (e.g., a subset of sensor data type) from a complete set of parameters available that provides the greatest sensitivity in predicting operational outcomes of interest may be used for the purposes of generating the sub-models.

After generation of a variety of sub-models, the sub-models may be tuned (or further updated) for one or more particular target metrics, where such tuning can be conducted by applying validation protocols. For example, a number or percentage of false-negatives and/or false-positives in predicting the operational outcome of interest may be tuned to be in a desired range. In various embodiments, the sub-models may be combined after tuning them for any desired range of false-positives and false negatives. In other embodiments, the outputs of the sub-models can be combined to provide the super-model in a manner (e.g., by selection of weights of each of the sub-models in the overall super-model), such that the super-model exhibits particular desired performance parameters. For example, the sub-models may be combined with weights or with super-model trigger rules, such that the aggregate super-model exhibits a particular desired range of false-positives and/or false-negatives in predicting the fault(s) or outcome(s) of interest to be monitored. Therefore, in this case, training the super-model may entail the applying appropriate weights by including a one or more of the sub-models within the super-model.

In training the sub-models and/or the super-model, the predictive system 160 may employ the aggregated data set 190 (FIG. 2B) that may be stored in the historical source database 170. The aggregated data set 190 may be partitioned in some embodiments into a first portion and a second portion of contextualized data for analysis. The first portion of the aggregated data set 190 may be used for the purposes of generating the sub-models and the super-models (e.g., training). The second part of the aggregated data set 190 may be used to generate the super-model by combining the sub-models in a manner such that false-positives and/or false-negatives are held within predetermined threshold bounds.

Upon generation of the super-model using the aggregated data set 190, the super-model may be deployed. At this point, the predictive system 160 may utilize real-time or near real-time operational data 198 (FIG. 2B) received from the one or more sensors 120 deployed at the operating system 110 or in association with the equipment 112, such as being received via the controller(s)/user device(s) 124, the master controller/on-site server 128, and/or network(s) 140 (FIG. 1). The received operational data 198 can be aggregated 188 and the resulting features used to predict operational outcomes of interest for the operating system 110, equipment 112, and/or processes to which the real time and/or near real time data pertain. When the predictive system 160 makes a prediction of a fault (e.g., a fault is likely to occur within some pre-determined span of time in the future), the predictive system 160 can be configured to provide an indication thereof to one or more entities associated with the operating system 110, such as to an operator via his/her user device 124 or a control center via the master controller/on-site server 128.

As described above, the predictive system 160 can be configured to continuously or periodically update the sub-models and/or the super-model based on features evaluated using new data generated from continued operation of the operating system 110 or equipment 112 or associated processes received as real-time or near real-time data operational data 198. Thus, the model(s) 194 (FIG. 2B) used for predicting fault may be dynamic in nature and may be refined over time to be of greater predictive value. In other words, the dynamic nature of the model(s) may be adaptive, from a contextual standpoint, to changing scenario(s) under which the model(s) are applied. In some embodiments, those contextual changes, as embodied in the fitting parameters of the sub-models, and thus in the combined super-model, can be updated continuously over time. It will be appreciated that the dynamic nature of the model(s) can be capable of providing relatively updated, accurate, and precise prediction of faults or outcomes of interest, even if the base conditions under which an environment is monitored changes over time during operation of the operating system 110 or equipment 112 or a process associated therewith.

The predictive system 160, in some embodiments, whether located at or near the point of operation of the operating system 110 or remotely located, may be controlled/managed and or owned by an entity other than an entity that controls and/or owns the operating system 110 and/or the equipment 112 and processes implemented therein. In these cases, a third party entity may provide data analysis and fault prediction capability to the entity that may own and/or control the operating system 110, equipment 112, and/or the processes running thereon. In other embodiments, the predictive system 160, whether located at the operating system 110 or remotely located, may be controlled and/or owned by the same entity that controls and/or owns the operating system 110 and/or the equipment 112 and processes therein.

As a non-limiting example, the source data 172 collected may be from an operating system 110 that is a steel-rolling plant producing rolled steel product using a rolling process. The data may include measurements such as, but not limited to, temperature of steel, extrusion speed of molten steel, rolling pressure, thickness, equipment temperature, equipment consumable levels, or the like. Temperature sensors, pressure sensors, user-inputted data, equipment usage logs, in-line product testing, ex-situ product testing, or the like may be used as data for fault prediction in this type of process and equipment. Such data may be used, for example, by the predictive servers 160 to predict any variety of faults associated with steel rolling, including, for example cobbling faults, where near-molten steel may be misaligned in rolling equipment and resulting in extrusion of the steel at relatively high speed from the equipment. This type of failure may result in expensive clean-up, waste of raw product, and/or equipment down time. Therefore, predicting and preventing this type of operational outcome in advance may enable more efficient production of steel and greater efficiency and profits from the steel plant, equipment, and/or processes being monitored by the methods and systems described herein.

As another non-limiting example, the operating system 110 may be a train comprising train/locomotive-based sensor(s) used to monitor, e.g., the temperature of the undercarriage of a train and other operational conditions to predict any variety of operational outcomes such as, for example, brake failure or traction motor failure. In another non-limiting example, a variety of sensor(s) in a semiconductor manufacturing line housed in a semiconductor fabrication facility may be employed to collect a variety of data related to a semiconductor manufacturing process. This data may include in-line tests, sampled tests, equipment logs and/or monitors, end-of-line tests, visual inspections, automated inspections, electrical test device data, etc. The rich data sets produced in semiconductor manufacturing processes may be stored locally on, e.g., an on-site database 130 (FIG. 1) and may be periodically and/or upon solicitation provided to the predictive system 160 for storage in the historical source database 170 and further use in generating and/or updating predictive models 194 (e.g., operational outcome predicting models) and detecting operational outcomes of interest (e.g., such as faults or failures). Indeed, it will be appreciated that the methods and systems described herein, in accordance with various embodiments, may be deployed for operational outcomes of interest such as predictions or detection of likely operational outcomes resulting from continued operation of any type of factory, transportation, logistical, or service delivery environment, where such predictions or detections are substantially accurate in the context in which the operating system 110 or equipment 112 operates.

Figure 3:
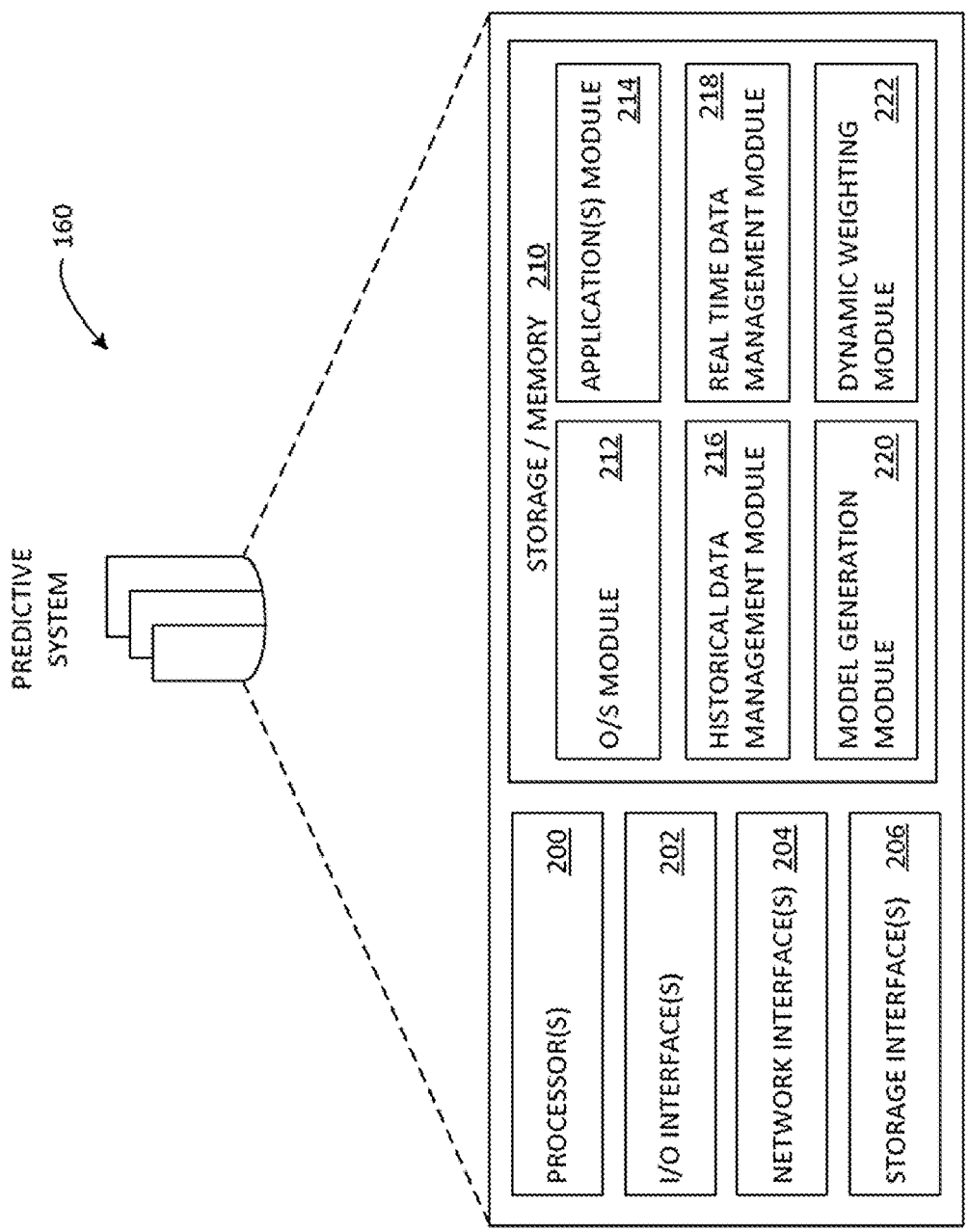
FIG. 3 is a simplified schematic diagram of an example of the predictive system of FIG. 1, in accordance with various embodiments of the present disclosure.

FIG. 3 is a simplified block diagram illustrating an example of a predictive system 160 for generating and deploying dynamically updated predictive models, in accordance with various embodiments of the disclosure. The predictive system 160 may include one or more processors(s) 200, one or more input/output (I/O) interfaces 202, one or more network interface(s) 204, one or more storage interface(s) 206, and one or more storage or memories 210.

The processor(s) 200 of the predictive system 160 can be implemented as appropriate in hardware, software, firmware, or combinations thereof. Software or firmware implementations of the processor(s) 200 can include computer-executable or machine-executable instructions written in any suitable programming language to perform the various functions described. Hardware implementations of the processor(s) 200 may be configured to execute computer-executable or machine-executable instructions to perform the various functions described. The one or more processor(s) 200 can include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The predictive system 160 can also include a chipset (not shown) for controlling communications between one or more processor(s) 200 and one or more of the other components of the predictive system 160. The processor(s) 200 may also include one or more application specific integrated circuits (ASICs) or application specific standard products (ASSPs) for handling specific data processing functions or tasks. In certain embodiments, the predictive system 160 may be based on an Intel® Architecture system and the one or more processor(s) 200 and chipset may be from a family of Intel® processors and chipsets, such as the Intel® Atom® processor family.

The one or more I/O interface(s) 202 can enable the use of one or more I/O user interface(s). The I/O interface(s) 202 can be configured to receive and/or provide signals to/from the processor(s) 200 from I/O user interface(s). These signals may be related to user input and output to users, such as an operator of the predictive system 160, that interact with the predictive system 160. The I/O interface(s) 202 may receive and/or provide signals to any variety of I/O user interface(s) including, but not limited to, accelerometers, gyroscopes, display screens, push-buttons, rocker switches, keyboards, biometrics reading devices, mouse pads, mice, speakers, microphones, cameras, haptic devices, combinations thereof, or the like.

The network interfaces(s) 204 may allow the predictive system 160 to communicate via network(s) 140 and/or via other communicative channels. The network interfaces(s) 204 can include one or more transceiver(s) or other communication circuitry (e.g., cellular, Bluetooth®, etc.) configured to facilitate communication of information (e.g., source data 172, predicted outputs 196, operational data 198, etc.) between the predictive system 160, the operating system 110 (FIG. 1), controller(s)/user device(s) 124, master controller/on-site server 128, and other entities such as, e.g., centralized or local operational centers associated with the operating system 110. The one or more storage interface(s) 206 can enable the use of the storage/memory 210 and/or other memory/storage components, such as external databases (e.g., the on-site database 130 and/or the historical source database 170 of FIG. 1). The storage interface(s) 206 can be configured to receive data from the processor(s) 200 to store onto the memory 210 or other storage device or provide data from the memory 210 or other storage device to the processor(s) 200.

The memory 210 can include one or more volatile and/or non-volatile memory/storage devices including, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory 210 can store program instructions that are loadable and executable on the processor(s) 200, as well as data generated or received during the execution of these programs. Turning to the contents of the memory 210 in more detail, the memory 210 can include one or more operating systems (O/S) 212, an applications module 214, a historical source data management module 216, real time data management module 218, model generation module 220 and/or a dynamic weighting module 222. Each of the modules and/or software may provide functionality for the predictive system 160, when executed by the processors 200. The modules and/or the software may or may not correspond to physical locations and/or addresses in memory 210. In other words, the contents of each of the modules 212, 214, 216, 218, 220, 222 may not be segregated from each other and may, in fact be stored in at least partially interleaved positions on the memory 210.

The O/S module 212 can have one or more operating systems stored thereon. The processor(s) 200 can be configured to access and execute one or more operating systems stored in the (O/S) module 212 to operate the system functions of the predictive system 160. System functions, as managed by the operating system can include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 214 can contain instructions and/or applications thereon that may be executed by the processor(s) 200 to provide one or more functionality associated with the predictive system 160. These instructions and/or applications can, in certain aspects, interact with the (O/S) module 212 and/or other modules of the predictive system 160. The applications module 214 may have instructions, software, and/or code stored thereon that may be launched and/or executed by the processor(s) 200 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof. In some embodiments, the processor(s) 200, by executing instructions stored in the application(s) module 214 may be configured to establish predictive operational outcomes of interest and/or analytical models and deploy the same for real time or near real time operational outcomes of interest monitoring based on received data and/or information.

The source data management module 216 can have instructions stored therein that, when executed by the processor(s) 200, enables the predictive system 160 to perform a variety of processes associated with retrieving/receiving source data 172 (which may include historical data 170), managing the source data 172 (which includes incorporation of the received operational data 198 derived from continued operation of the operating system 110 or equipment 112 to generate updated source data 172 for further use and analysis herein), and/or storing as historical source data 170. In various embodiments, the processor(s) 200 can be configured to transmit a request for source data 172 and/or historical source data 170 and receive, responsive to the request, the source data 172 or other historical source data over a span of time. The processor(s) 200 can be configured to receive sensor data and/or log data from controller(s) or user device(s) 124 (FIG. 1), either directly from one or more sensors 120 or the user device(s) 124, or from other intermediary entities, such as the master controller or on-site server 128 (FIG. 1), and store the senor data and/or log data in the historical source data 170. The historical source data 170 may be used to archive pertinent data related to operation of the operating system 110 or equipment 112 for any suitable time period for later use.

This extraction, transform, and load (ETL) process may be performed, in various embodiments, by the processor(s) 200 to properly store relevant data in the historical source data 170 for subsequent use in generating and/or updating the predictive models 194 (e.g., operational outcomes of interest prediction models). The historical source data 170 can be evaluated, filtered, and/or cleaned by the processor(s) 200 to remove any data that may not be correctly representative of the state of the operating system 110 or equipment 112 and/or processes running thereon, such as, for example, noisy data, incorrectly measured data, false readings, inaccurate logs, etc. In other words, the processor(s) 200 may be configured to filter out bad data from the historical source data 170 that may be available to it from the operating system 110 or equipment 112 (FIG. 1) and associated processes being measured. In some embodiments, any suitable mechanism may be employed to filter the historical source data 170 that may be used by the processor(s) 200 to generate the predicting sub-models and/or super-model. For example, a set of heuristic rules may be used for formatting the historical source data 170 for use as source data 172. Such heuristic rules, for example, may discard data that has a change (e.g., immediate delta or averaged delta) from a previous and/or subsequent data point(s) in a time series of that parameter data that exceeds a threshold change level. In other words, if the data includes an unrealistic temporal progression, then filtering algorithms operating on the processor(s) 200 may filter the data that may be spurious in nature. Indeed, other mechanisms for identifying spurious data, such as relatively wide swings over time, jitter, filtered noise, or inconsistent correspondence with other parameter data, may be used to filter and cleanup historical data 170 that is to be used as source data 172 for model generation and/or updating.

The processor(s) 200 can also be configured to partition the historical source data 170 for the purposes of training models and testing/tuning models. As a non-limiting example, the historical source data 170 may be divided into a first portion that is 70% of the total historical source data available and a second portion that is the remaining 30% of the total historical source data 170 available. In this case, the first portion may be used by the processor(s) 200 for the purposes of training the sub-models. The second portion may be used by the processor(s) 200 to test/tune the sub-models and/or the weights ascribed to the sub-models for the super-model based at least in part on targets for false positives and/or false negative errors.

The real time data management module 218 can have instructions stored therein that, when executed by the processor(s) 200, can enable the predictive system 160 to perform a variety of processes (e.g., various aspects of the feature discovery and runtime processes of FIG. 2B) or portions of the processes associated with receiving real time or near real time data and applying the latest predictive model(s) 194 (FIG. 2B) to the incoming data to identify any impending operational outcomes of interests in the operating system 110, equipment 112, or processes being monitored. Upon generation of the predictive models 194 using the formatted data 174 (FIG. 2B), the predictive models 194 may be utilized. At this point, the predictive system 160 may receive real-time or near real-time data from the sensors deployed at the operating system 110, such as via the controller(s)/user device(s) 124, the master controller/on-site server 128, and/or network(s) 140. The received operational data 198 can then itself be used to predict operational outcomes of interests in the operating system 110, equipment 112, and/or processes to which the real time and/or near real time data pertain, as is illustrated in FIG. 2B. When the predictive system 160 makes a prediction of one or more operational outcomes of interest (e.g., a fault that is predicted to likely occur within some pre-determined span of time in the future), the predictive server 160 may be configured to provide an indication thereof to one or more entities associated with the operating system 110 or equipment 112 such as, e.g., to an operator via his/her user device 124.

The processor(s) 200 can further be configured to continuously or periodically update the predictive models 194 (e.g., sub-models and/or the super-model) based on new source data 172 that is generated though the feature discovery and runtime processes. Thus, the predictive model(s) 192 used for predicting operational outcomes of interest may be dynamic in nature and may be refined over time to be of greater predictive value and accuracy. To this end, the processor(s) 200 when receiving the real-time or near real-time source data 172 can format 174 and archive it in, e.g., the historical source data 170. This updated historical source data 170 can be further applied in a real-time or near real-time fashion to the predictive models 194 for the purpose of predicting operational outcomes of interest. The processor(s) 200 can further be configured to use substantially real-time source data 172, as it is received as operational data 198 or after a pre-determined period of archiving, to update the contextualization 186 (FIG. 2B) and/or retrain the predictive models 194 (e.g., sub-models and/or the super-model), as deployed by the predictive system 160.

The predictive system 160 and the processor(s) 200 therein, by executing the instructions stored in the model generation module 220, can be configured to train the predictive models 194, which can include sub-models and super-models that combine the sub-models using various weights and/or parameters, for the purposes of predicting any variety of operational outcomes of interest that may be associated with the operating system 110 or equipment 112. The sub-models may be any suitable type of model or classifier for predicting an operational outcome of interest based on a variety of historical or real time data associated with the operating system 110, equipment 112, any processes related thereto. In the training phase (e.g., pre-deployment phase), the processor(s) 200 can be configured to generate any variety of sub-models based at least in part on received source data 172 and the feature contextualization 186 (FIG. 2B), as available, for example, to the predictive system 160 from the historical source data 170. The processor(s) 200 may be configured to generate the sub-models based not only on the historical source data 170, but also can be based on historical knowledge of the occurrence of the operational outcome of interest, which is being predicted using the sub-models, as one example. The sub-models may be comprised of any suitable type of model or predictive analytics, such as regression models, random trees, random forest, naïve Bayes, decision trees, support vector machines, logistic regression, probit regression, combinations thereof, or the like. In various embodiments, the processor(s) 200 may be configured to perform a PCA to identify those parameters (e.g., sensor data) from among a richer set of data that may be the most useful in predicting a particular operational outcome of interest. The processor(s) 200 may be configured to generate one or more sub-models using the received and historical source data, such as formatted source data 176 stored that becomes part of the historical source data 170.

In various embodiments, at least two predictive sub-models can be generated and combined with a super-model. In other embodiments, more than two predictive sub-models may be generated and combined to form the super-model. In yet further embodiments, five or more predictive sub-models may be generated and combined to form the super-model. In some embodiments, principal component analysis (PCA) may be performed to determine what formatted source data 176, such as that generated from one or more sensors 120, may be the most pertinent to the generation of operational outcomes of interest predicting sub-models. In various embodiments, the sub-models may be generated in a manner where only a subset of parameters (e.g., a subset of a sensor or other data type associated with the operating system 110, equipment 112 or processes associated therewith) from a complete set of available parameters or source data 172 that provides the greatest sensitivity in predicting operational outcomes of interest may be used for the purposes of generating the sub-models. In other words, in some embodiments, the aggregated data set 190 (e.g., aggregated from corresponding to formatted source data 176) that are used as inputs to a sub-model can be a sub-set of all possible features for which source data 172 is collected for that particular operating system 110, equipment 112 or process.

In various embodiments, the processor(s) 200 can be configured to train a first sub-model that incorporates a first portion of aggregated data set 190 and train a second sub-model that incorporates a second set of aggregated data set 190, where the first portion of aggregated data set 190 is not necessarily the same as the second portion of aggregated data set 190, for example, each represents operational data 198 that was collected at different times during operation of machine 112. In some embodiments, the processors(s) 200 may be configured to use only a portion of the available historical source data 170 to train each of the sub-models to be generated. As a non-limiting example, 60% of the available historical source data, such as historical sensor data stored in historical source data 170, may be used for the purpose of sub-model training. The remainder of the available historical source data 170 may be reserved for the purpose of sub-model testing/tuning and/or super-model testing/training.

In some embodiments, prior to combining the sub-models for the super-model with suitable corresponding weighting, the sub-models may first be tested and/or tuned using a portion of the aggregated data set 190. The processor(s) 200 may be configured to apply a sub-model generated using a first portion of the available aggregated data set 190 to the second portion of the available aggregated data set 190. At this point, the processor(s) 200, in various embodiments, may be configured to tweak the parameters (e.g., coefficients of a regression model) to ensure that the sub-model performs within a maximum number/rate of permitted false positives (e.g., predicting a fault when there is no fault in the historical testing data) and/or false negatives (e.g., not predicting a fault when there is a fault in the historical testing data) errors. It will be appreciated that the threshold number/rate of false positives and false negatives may be symmetric in some cases or asymmetric in other cases, depending on the needs of the user(s) of the predictive system 160. For example, in some non-limiting examples, the rate of false positives and false negatives allowed (e.g., the false positive threshold rate and the false negative threshold rate, respectively) may be set to the same level. In other non-limiting examples, the false positive threshold rate may be set at a higher level than the false negative threshold rate to allow a greater frequency of false positives than false negatives. In yet other non-limiting examples, the false negative threshold rate may be set at a higher level than the false positive threshold rate to allow a greater frequency of false negatives than false positives.

The processor(s) 200 may be configured to perform the sub-model training using the second portion (e.g., the testing portion) of the historical source data 170 to ensure that all of the sub-models that are to be used for the generation of the super-model are each individually performing within a desired band of error (e.g., threshold values for false positives and false negatives). In some alternative embodiments, the individual sub-model testing may be optional and instead, after generating each of the sub-models, the processor(s) may proceed to weighting the sub-models in the super-model using the second portion (e.g., testing portion) of the historical source data 170, prior to super-model deployment.

The processor(s) 200, by executing instructions stored in the model generation module 220, may further be configured to tune the sub-models and the super-model dynamically with incoming real-time or near real-time data. In various embodiments, the tuning may be performed continuously. In other embodiments, the tuning may be performed at a pre-determined frequency. In various embodiments, the sub-models and/or super-model may be trained with source data 172 incoming in real-time or near real-time data to meet performance targets (e.g., performance threshold for false negatives and false positives).

The predictive system 160 and the processor(s) 200 thereon, by executing the instructions stored in the dynamic weighting module 222, may be configured to dynamically update the super-model after deployment. In various embodiments, the processor(s) 200 may be configured to dynamically update both the sub-models and the weighting of the sub-models in within the super-model based at least in part on source data 172 incoming in real-time or near real-time. In various embodiments, the processor(s) 200 may be configured to tune the super-model and/or the sub-models to adhere to perform metrics over a pre-determined span of such incoming real-time or near real-time source data 172, such as, for example, a number or percentage of false-negatives and/or false-positives in predicting operational outcomes of interest. In these embodiments, as real-time or near real-time source data 172 comes in and are available to the processor(s) 200, the processor(s) 200 may be configured to tune in a desired range of these performance metrics by modifying the super-model, as well as the sub-models, in various embodiments. In the same or other embodiments, the sub-models may be combined after tuning them for any desired range of false-positives and false negatives. In other embodiments, the sub-models may be combined to form the super-model in a form (e.g., by selection of weights of each of the sub-models in the overall super-model), such that the super-model exhibits particular desired performance metrics. For example, the sub-models may be combined with weights or with super-model trigger rules, such that the aggregate super-model exhibits a particular desired range of false-positives and/or false-negatives in predicting the operational outcomes of interest(s) to be monitored. Therefore, in this case, training the super-model may entail the appropriate weights, mix, polling, heuristic triggering, or any other suitable combining of the sub-models into the super-model.

It will be appreciated that there may be overlap in the functionality of the instructions stored in the operating systems (O/S) module 212, the applications module 214, the historical source data module 216, the real time (operational) data management module 218, the model generation module 220, and/or the dynamic weighting module 222. In fact, the functions of the aforementioned modules 212, 214, 216, 218, 220, 222 may interact and cooperate seamlessly to implement the feature discovery and runtime processes under the framework of the predictive system 160. Indeed, each of the functions described for any of the modules 212, 214, 216, 218, 220, 222 may be stored in any module 212, 214, 216, 218, 220, 222 in accordance with certain embodiments of the disclosure. Further, in certain embodiments, there may be one single module that includes the instructions, programs, and/or applications described within the O/S module 212, the applications module 214, the historical source data module 216, the real time (operational) data management module 218, the model generation module 220, and/or the dynamic weighting module 222.

Figure 4:
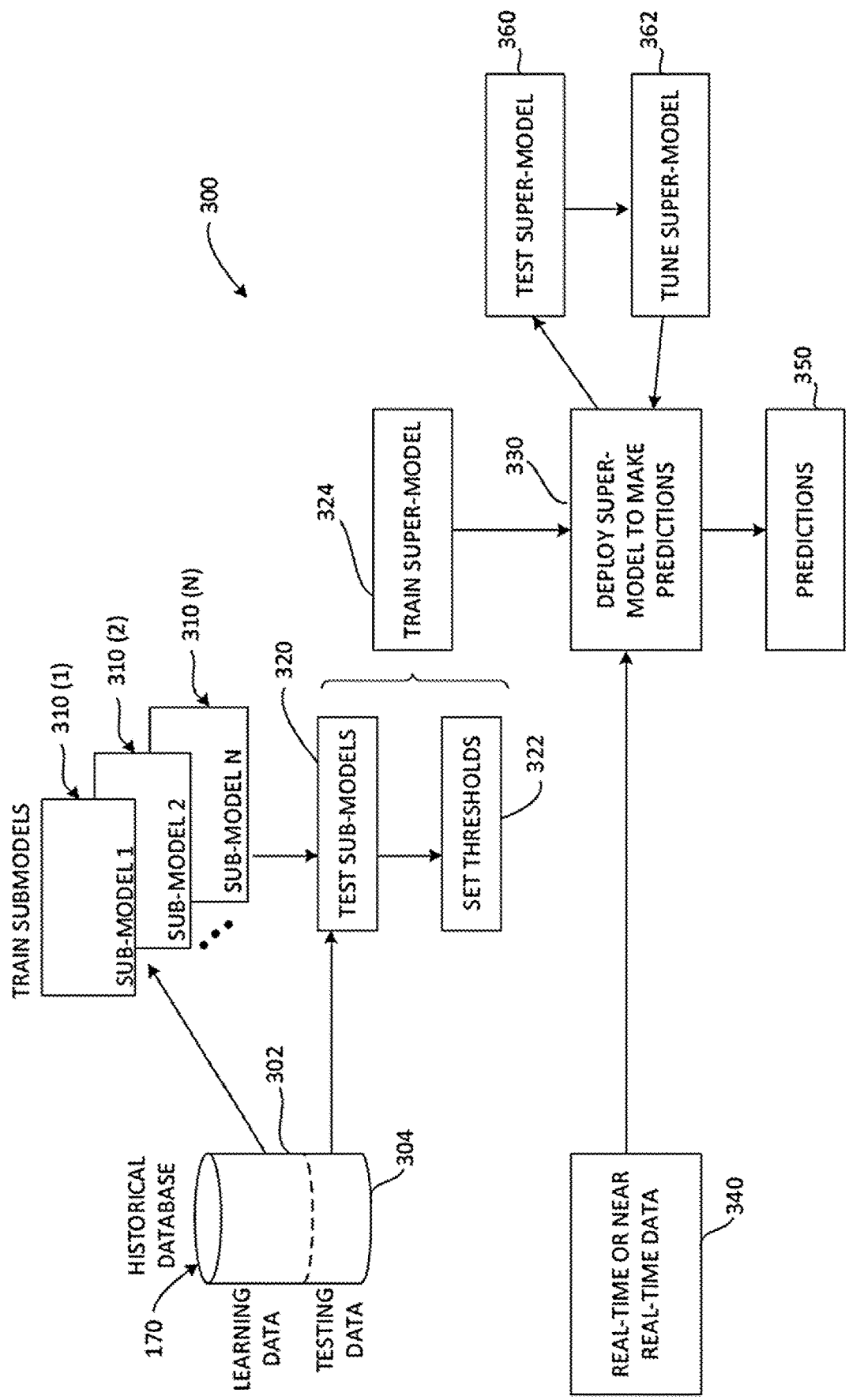
FIG. 4 is a simplified schematic diagram illustrating an example for generating and deploying a supermodel for predicting faults or other outcomes of interest, in accordance with various embodiments of the present disclosure.

FIG. 4 is a schematic diagram of illustrating an example mechanism 300 for generating and deploying a super-model 330 for predicting operational outcomes of interests or other outcomes of interest 350, in accordance with various embodiments of the disclosure. As described above, the historical source database 170 (FIG. 1) including, e.g., the formatted source data 176 and aggregated data set 190 (including feature data context values) of FIG. 2B, may be partitioned into two different partitions. The first partition 302 may be used to develop a variety of sub-models, including a first sub-model 310(1), a second sub-model 310(2), and a Nth sub-model 310(N), referred to individually or collectively as sub-models 310. These sub-models 310 may be of any suitable variety and may incorporate any suitable feature data context inputs to make the operational outcomes of interest or other outcome of interest predictions desired for the operating system 110, (FIG. 1) equipment 112 (FIG. 1) and processes operating thereon. The sub-models may incorporate, for example, any combination of model (e.g., statistical model) or predictive analytics, such as regression models, random trees, random forest, naïve Bayes, decision trees, support vector machines, logistic regression, probit regression, combinations thereof, or the like.

In some embodiments, at least two predictive sub-models 310 may be generated and combined for the super-model

330. In other embodiments, more than two predictive sub-models 310 may be generated and combined for the super-model 330. In yet further embodiments, five or more predictive sub-models 310 may be generated and combined for the super-model 330. In various embodiments, feature discovery may be performed to generate the contextualizations 186 (FIG. 2B) that are most pertinent to the generation of the predictive sub-models 310. In some embodiments, principal component analysis (PCA) may be performed to determine what source data 172 of FIG. 2B (e.g., sensor input parameters) may be the most pertinent to the generation of the predictive sub-models. In various embodiments, the sub-models 310 may be generated in a manner where only a subset of the source data 172 or parameters (e.g., a subset of sensor data type) from a complete set of input parameters available that provides the greatest sensitivity in predicting operational outcomes of interests, may be used for the purposes of generating the sub-models 310.

As discussed above, a second portion of the historical source data 170 may be used as testing data 304. This testing data may be used to test the sub-models 320 and set thresholds and parameters 322. The testing of the sub-models 320 may be performed to tune model parameters on a new set of historical source data 304 (e.g., not the data 302 used for the purpose of generating the sub-models 310) to meet particular desired thresholds 322 and performances. For example, during this process of sub-model testing 320, fitting parameters, such as, for example, the coefficients of a regression model, may be tuned to yield a desired acceptable range of percentage of false positives and/or a desired acceptable range of percentage of false negatives resulting from each of the various sub-models 310.

Next, the super-model can be trained 324. This may entail combining the sub-models 310 for the super-model 330. The super-model 330 may utilize any suitable combination of the sub-models 310. In one non-limiting example, the super-model may be a weighted linear combination of the various sub-models 310. In another non-limiting example, the sub-models 310 may provide a Boolean output of an indication of an operational outcomes of interest (e.g., fault expected within a predetermined span of time or no fault expected in the predetermined span of time) and the super-model 330 may provide a majority decision of the various constituent sub-models 310. In other embodiments, the super-model 330 may be any variety of non-linear and/or non-continuous combinations (e.g., functions) of the constituent sub-models 310.

After the super-model 330 is deployed, real-time or near real-time data 340 (e.g., source data 172), as received by the predictive system 160 may be aggregated 188 (FIG. 2B) and applied to the super-model 330. This procedure may generate predictions 350, such as predictions 350 of an upcoming fault, an upcoming operational outcomes of interest within a predetermined time span in the future, no upcoming operational outcomes of interest, no upcoming operational outcomes of interest within the predetermined time span in the future, a probability of an upcoming operational outcomes of interest, a probability of an upcoming operational outcomes of interest within the predetermined time span into the future, the likelihood of other outcomes of interest, combinations thereof, or the like.

While the real-time or near real-time data 340 (e.g., aggregated data set 190) are provided to the deployed super-model 330, the super-model 330 and/or sub-models 310 may be tested 360 and/or refined 362 concurrently. The refinements may be performed continuously or when a sufficient amount of real-time or near real-time source data 172 has accumulated to provide a relatively meaningful refinement to the super-model 330 and/or sub-models 310.

Figure 5:
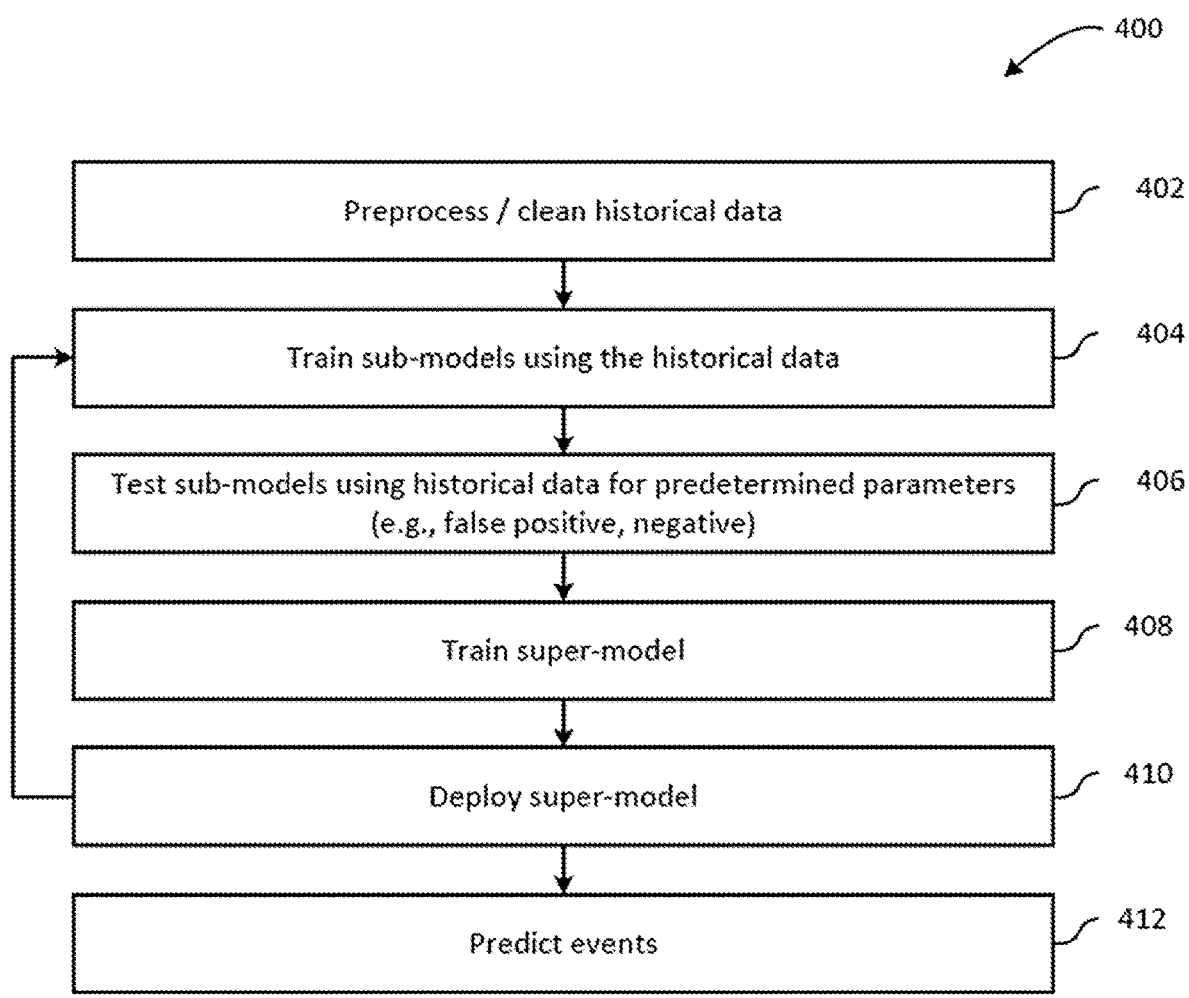
FIG. 5 is a flow diagram illustrating an example of predicting outcomes of interest by deploying and continuously updating a predictive supermodel based at least in part upon a plurality of sub-models, in accordance with various embodiments of the present disclosure.

FIG. 5 is a flow diagram illustrating an example of a method 400 for predicting operational outcomes of interest events in a process by deploying and continuously updating a predictive super-model 330 (FIG. 4) based at least in part on a plurality of sub-models 310 (FIG. 4), in accordance with certain embodiments of the disclosure. This method 400 may be performed by the predictive system 160 (FIG. 1) and the processor(s) 200 thereon in cooperation with one or more entities of environment 100.

At 402, historic data (e.g., source data 172 of FIG. 2B, which can include operational data 198 as updated historical data 190) can be preprocessed and/or cleaned and then aggregated 188 (FIG. 2B). This may be performed in accordance with the descriptions above with relation to extraction, transform, and load (ETL) processes. At 404, the sub-models 310 can be trained using historical source data 170 that has been aggregated, or a partition thereof. In this case, aggregated data set 190 (FIG. 2B), generated by the processes at 402, may be used for the training of the sub-models 310. The aggregated data set 190 can include operational data 198 (FIG. 2B) such as, e.g., maintenance logs, replacement or repair records, wear or test measurements, or an indication of whether the outcome of interest occurred. For example, maintenance/repair evaluations and performance results from one or more actual prediction output 196 (e.g., whether the prediction was right or a condition existed that could have resulted in the outcome of interest) can be used in the training of the sub-models 310.

At 406, the trained sub-models 310 can be tested using historical source data 170, such as a second partition of the aggregated data set 190, and predetermined parameters or metrics. These metrics may include desired levels of false positives and/or desired levels of false negatives. There may be provided threshold (e.g., a permitted upper-bound) of false positives and/or false negatives. Such metrics may be used to tune the weighting of the sub-models 310 that are to be combined to form the super-model 330. For example, the weighting of the sub-models 310 in the super-model 330 may be determined based at least in part on keeping a false positive error level below a respective threshold level and keeping a false negative error level below a respective threshold level when the super-model 330 is applied to the second partition of the historical source data.

At 408, the super-model 330 can be trained. This training may involve determining weights associated with each of the sub-models 310 or other suitable mechanisms for combining the sub-models 310 for the super-model 330 that is to be deployed. In some embodiments, the sub-models 310 may be combined in a manner such that certain metrics are kept in control. Operational data 198 such as maintenance/repair evaluations and performance results (e.g., whether the prediction was right or a condition existed that could have resulted in the outcome of interest) that are associated with an actual prediction output 196 can be used to improve training of the super-model 330. In some embodiments, the predictive model 194 may be based upon a contextualization 186 that includes the performance results as a feature 180. For example, the performance results can be used to aid in determining the weights associated with the sub-models 310. The super-model 330 may be tested using a second partition of the aggregated data set 190 that is designated for testing model(s).

At 410, the super-model 330 can be deployed for use. Upon deployment, the super-model 330 may be used to predict the likelihood of operational outcomes of interest or other outcomes of interest to some point in the future (predicted outputs 196 of FIG. 2B). The decision to deploy the super-model 330 may be based upon the validation of that super-model 330, the current super-model being used and/or other previously trained super-models 330. In some embodiments, the super-model 330 that provides the best prediction of the operational outcome of interest can be deployed immediately or as some subsequent time. At 412, events or other outcomes of interest can be predicted by applying the super-model 330 to incoming real time or near real time data using source data 172. This real time or near real time data may be received from the operating system 110 or equipment 112, as an example. In some cases, the predicted outputs 196 may be applicable to (or likely to occur or not occur during) a defined time step in the future (e.g., 30 minutes out, 1 day out, 7 days out, etc.). The lead-time for the predictions may be based at least in part on a variety of factors, such as, for example, the frequency and/or granularity of the input parameter data and/or the performance metric targets of the models themselves. The super-model 330, once deployed, may produce true operational outcomes of interest predictions, as well as false positives. The super-model 330, once deployed, may further miss predictions of operational outcomes of interests that may occur. The super-model 330, or the predictive system 160, may indicate a predicted operational outcomes of interest in any variety of suitable mechanisms including, for example, sending a message (e.g., text, email, pop-up, application specific message, etc.) to one or more user devices 124 or on-site server 128, providing audio alerts, providing video alerts, or the like.

It should be noted that the method 400 may be modified in various ways in accordance with certain embodiments of the disclosure. For example, one or more operations of method 400 may be eliminated or executed out of order in other embodiments of the disclosure. Additionally, other operations may be added to method 400 in accordance with other embodiments of the disclosure. In some embodiments, a plurality of super-models 330 can be deployed to provide predictions regarding the operational outcome of interest. In various embodiments, the super-models can compete with each other over some interval of time to determine which performs the best and select that super-model 330 for use. The competition can be repeated at defined intervals to make sure the most effective super-model 330 is being used to provide the predicted output 196.

Figure 6:
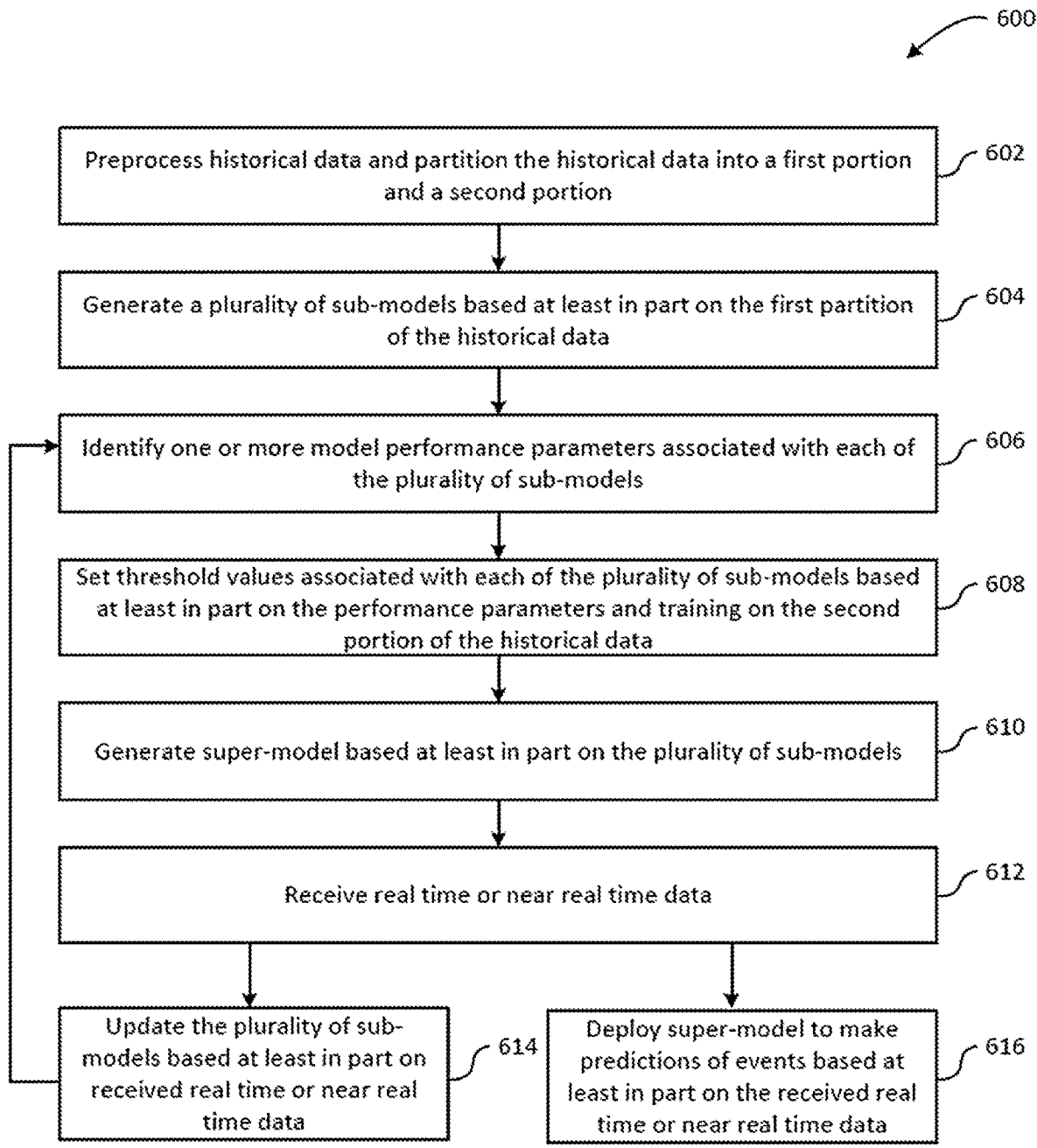
FIG. 6 is a flow diagram illustrating an example of predicting outcomes of interest using a dynamically updated predictive model, in accordance with various embodiments of the present disclosure.

FIG. 6 is a flow diagram illustrating another example of a method 600 for predicting operational outcomes of interest using a dynamically updated predictive model, in accordance with certain embodiments of the disclosure. The method 600 may be performed by the predictive system 160 (FIG. 1) and the processor(s) 200 thereon in cooperation with one or more entities of the environment 100. At 602, source data 172 of FIG. 2B can be preprocessed and then partitioned into a first partition and a second partition. At 604, a plurality of sub-models 310 (FIG. 4) can be generated based at least in part on the first partition of the source data 172. The sub-models 310 can be based upon a contextualization 186 identified by feature discovery as shown in in FIG. 2B. Feature data context values that include feature data having at least one contextual relationship identified by the feature discovery can be used.

At 606, one or more model performance parameters associated with each of the plurality of sub-models 310 can be identified. These performance parameters may include, e.g., a false positive or false negative acceptable range. At 608, threshold values associated with each of the plurality of sub-models 310 can be established based at least in part on the performance parameters and training of the sub-models 310 with the second portion of the source data 172.

At 610, a super-model 330 can be generated based at least in part on the plurality of sub-models 310. At 612, real-time or near real-time data be received as source data 172 from the operational data 198 and aggregated 188 as illustrated in FIG. 2B. At 614, the plurality of sub-models 310 may be updated or refined based at least in part on the received real time or near real time operational data 198 that is provided for use as source data 172. At 616, the super-model 330 may be deployed to make predictions of events based at least in part on the received real time or near real time operational data 198 (e.g., the aggregated data set 190). It will be appreciated that in various embodiments, the processes at 614 and 616 may occur concurrently or nearly concurrently.

It should be noted, that the example of FIG. 6 may be modified in various ways in accordance with certain embodiments of the disclosure. For example, one or more operations of the method 600 may be eliminated or executed out of order in other embodiments of the disclosure. Additionally, other operations may be added to method 600 in accordance with other embodiments of the disclosure.

Figure 7:
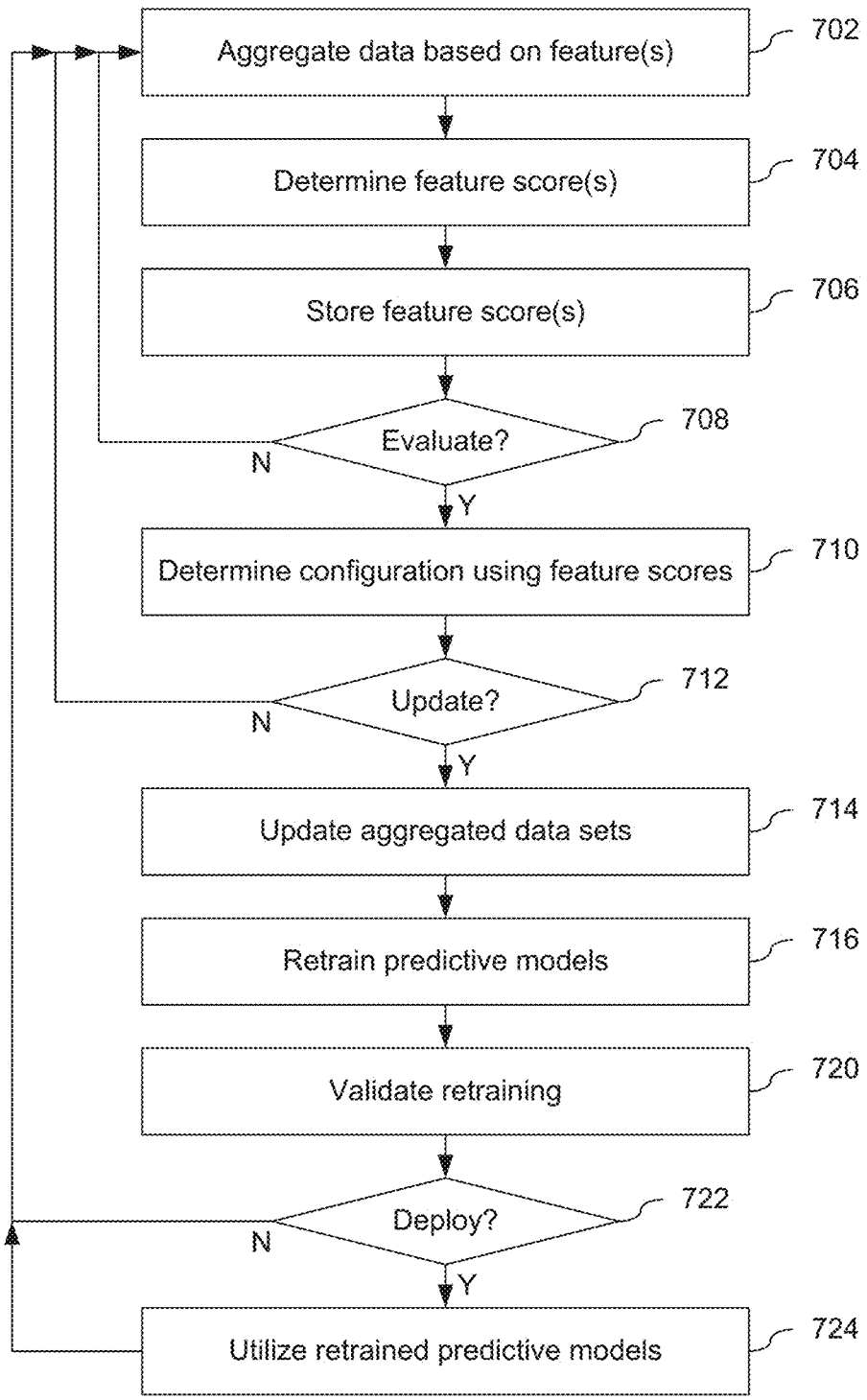
FIG. 7 is a flow diagram illustrating an example of the feature discovery of FIG. 2B, in accordance with various embodiments of the present disclosure.

Referring next to FIG. 7, shown is a flow diagram illustrating an example of the feature discovery of FIG. 2B. The feature discovery process is an autonomous process that can be executed by the predictive system 160 (FIG. 1) independently of the runtime process. As previously discussed, source data 172 that can include historical source data 170 as aggregated data set 190 can be formatted 174 for use by the feature discovery and runtime processes of FIG. 2B. Beginning at 702, the formatted source data 176 (FIG. 2B) is aggregated 178 (FIG. 2B) based on one or more feature definition(s). Feature definitions can be predefined or automatically generated based upon the available source data 172. The aggregation 178 can be triggered by the receipt of new/updated source data 172 by the predictive system 160 or can be initiated based upon a predefined schedule. Aggregation 178 of a feature can be based upon a temporal context such as, e.g., the average oil temperature during the past week or the number of time the oil temperature has exceeded a defined limit during the past month. In some cases, different features can utilize the same source data 172 with different temporal context such as time windows (e.g., the last day, the last week, the last month, etc.) or with different evaluation criteria (e.g., average temperature, temperature variation, or correlation to ambient temperature). While the aggregation 178 may be based upon a temporal context, it can also be based on spatial context (e.g., the average oil temperature during the past 1000 miles traveled) or group context (e.g., the variance from the mean oil temperature of a group of equipment).

After aggregation 178 of a feature 180 is completed, the feature 180 can be scored 182 (FIG. 2B) for an operational outcome of interest at 704 and the feature score 184 (FIG. 2B) stored at 706 (e.g., in a central data store of the predictive system 160 and/or the historical source database 170 of FIG. 1). For example, features 180 can be scored 182 using one or more of absolute univariate and/or relative mini-batched approaches. Examples of absolute univariate scoring include, e.g., determination of variance, correlation coefficients, and scoring with a model trained on only that single feature. Examples of relative mini-batched approach include, e.g., average rankings, average scores, and Elo scoring. Determining multiple feature scores 184 for the same feature 180 can assist in determining the strength or relationship between the feature and the operational outcome of interest, and its relationship with other features 180. The feature scores 184 can also be used to determine the weighting of different sub-models 310 (FIG. 4) for a super-model 330 (FIG. 4).

As the feature scores 184 are determined and stored, the decision to evaluate the feature scores 184 to determine contextualizations 186 is made at 708. The decision can be based on, e.g., the number of feature scores 184 have been determined, a defined time interval between evaluations, or other evaluation criteria. If not, then the feature discovery process can return to 702 where aggregation of features and determination of feature scores 184 continues. If the evaluation is triggered at 708, then one or more contextualizations 186 can be determined at 710. One or more contextualizations 186 for an operational outcome of interest can be determined using the feature scores 184. When a feature is found with a score 184 that satisfies a specification of the contextualization 186 for the outcome of interest (e.g., within a defined number of top scoring features such as, e.g., within the top 100 feature scores), then it can be used to generate a contextualization 186. In some embodiments, the features 180 of a contextualization 186 can be used to generate sub-models 310 (FIG. 4), with the contextualization 186 indicating the super-model 330. By periodically or randomly evaluating the feature scores 184, it is possible to reconfigure the predictive models 194 to take advantage of the most effective features for predicting the operational outcome of interest. This can be accomplished by updating the features 180 being used to predict the operational outcome of interest. By including the most effective features 180 (as determined by the feature score 184 for that outcome of interest), the effectiveness of the dynamically updated predictive model 194 can be maintained or improved even as the operational conditions relating to continued operation of the operating system 110 or equipment 112 change during operation thereof. For example, new features with higher scores 184 may be added while existing features with lower scores may be removed from the identified contextualizations 186.

If the predictive models 194 (FIG. 2B) not are ready to be updated at 712, then the identified contextualizations 186 can be stored and the feature discovery can return to 702, where it continues to aggregate 178 formatted source data 176 to determine feature scores. If the predictive models 194 are updated at 712, then the aggregated data set 190 (FIG. 2B) can be updated (or repopulated) at 714 to include any added features 184 and to remove any excluded features 184. This can be accomplished by adding the appropriate source data 172 and historical source data 170 to the aggregated data set 190 and removing the unused data from the aggregated data set 190. As the aggregated data set 190 are updated, the predictive models (e.g., sub-models 310 and super-model 330) can be retrained at 716. This can be accomplished in a sequential fashion or can be implemented concurrently after the initial training data of the aggregated data set 190 are updated. Retraining of the predictive models 194 is validated at 720, and if the validation is acceptable then the retrained predictive models 194 are ready for deployment and use.

Deployment of the predictive models 194 can be determined at 722 based upon a variety of operational conditions. For example, deployment of the retrained predictive models 194 may occur during off-hours of operation (e.g., between 2 am and 4 am) to minimize impact on the operating system 110. In other embodiments, deployment of the predictive models 194 may be based upon the amount of source data 172 being received. There may be a smaller impact on operational conditions when less source data 172, which can relate to reduced operation of the operating system 110 or equipment 112, is being received. In these cases, deployment may be delayed and the feature discovery can return to 702 until conditions are more appropriate for deployment of the predictive models 194.

If immediate deployment is desired at 722, then the retrained predictive models 194 can be used at 724 to provide predictions of the outcomes of interest based upon the real time or near real time source data 172. After deployment of the predictive models 194, the feature discovery returns to 702 to continue the aggregation 188 and feature scoring 182. The feature discovery process will eventually exhaust the volume of possible features. At that time, the feature discovery process can be restarted using all new data to update the previously determined feature scores 184. This allows the predictive models 194 to be dynamically updated as the monitored conditions of the operating system 110 or equipment 112 change or evolve during operation thereof.

Embodiments described herein may be implemented using hardware, software, and/or firmware, for example, to perform the methods and/or operations described herein. Certain embodiments described herein may be provided as one or more tangible machine-readable media storing machine-executable instructions that, if executed by a machine, cause the machine to perform the methods and/or operations described herein. The tangible machine-readable media may include, but is not limited to, any type of disk including floppy disks, optical disks, compact disk read-only memories (CD-ROMs), compact disk rewritable (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware. Additionally, in certain embodiments, a special-purpose computer or a particular machine may be formed in order to identify actuated input elements and process the identifications.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A system for predicting at least one operational outcome of interest associated with an operating system, hardware device, or machine, comprising:
   a computer, including:
   a. at least one memory that stores computer-executable instructions; and
   b. at least one processor that, when executing the computer-executable instructions, configures the system to:
      i. collect, by the computer, source data collected over a period of time, wherein the source data is derived information obtained from operation of the operating system, hardware device, or machine;
      ii. create, by the computer, feature data context values comprising feature data, wherein individual feature data context values comprise a set of feature data having at least one contextual relationship identifying a correlated context associated with the source data, the set of feature data comprising features aggregated based on one or more feature definitions associated with the at least one contextual relationship, wherein the individual feature data context values comprise transformed information generated from the source data using the one or more feature definitions, and wherein the individual feature data context values are derived from source data corresponding to a plurality of operational parameters associated with operation of the operating system, hardware device, or machine during the period of time in which the source data was generated;
      iii. analyze, by the computer, the feature data context values by application of a plurality of statistical models, independently, to each of the feature data context values, the analysis generating a correlation between the feature data in each feature data context value and each of the plurality of statistical models that are applied, wherein each correlation between the feature data context values and each statistical model generates one of a plurality of probability models associated with a likelihood of occurrence of an operational outcome of interest during operation of the operating system, hardware device, or machine;
      iv. validate, by the computer, each of the plurality of probability models, by both:
         1. testing an effectiveness of each of the plurality of probability models, independently, against at least some of the source data selected from a data source prior to deployment for the prediction of the operational outcome of interest; and
         2. combining some or all of the plurality of probability models to generate a supermodel and testing an effectiveness of the supermodel against at least some of the source data selected from the data source prior to deployment for the prediction of the operational outcome of interest;
      v. deploy, by the computer, at least one of the validated probability models for the prediction of the operational outcome of interest based on a comparison of results of the validation of the plurality of probability models and results of validation of currently deployed probability models against the at least some of the source data,
         wherein the system is configured to, by the computer, remove from use at least one currently deployed probability model that has been superseded by one or more subsequently generated probability models,
         wherein the one or more subsequently generated probability models have an increased correlation with the likelihood of occurrence of the operational outcome of interest than the at least one currently deployed probability model, and
         wherein the increased correlation is determined, at least in part, by source data derived from information generated from operation of the operating system, hardware device, or machine that occurred after generation of the source data used to generate the at least one currently deployed probability model that was removed from use, and wherein the system is configured to remove at least some of the source data or feature data context values from each of the probability of models prior to analysis with the plurality of statistical models and to re-incorporate at least some of the removed data or feature data context values at a later time into the supermodel; and
      vi. determine, using the deployed probability models, at least one predicted output related to a probability that the operational outcome of interest is likely to occur based at least in part upon current source data collected after deployment of the at least one validated probability model.

2. The system of claim 1, wherein the system is further configured to test, by the computer, at least one of the validated probability models against updated source data prior to the deployment for the prediction of the operational outcome of interest, wherein the updated source data is derived from information obtained during continued operation of the operating system, hardware device, or machine.

3. The system of claim 1, wherein the plurality of operational parameters is derived from information comprising one or more of at least times, locations, or environmental conditions associated with operation of the operating system, hardware device, or machine.

4. The system of claim 1, wherein the system is further configured to generate a signal receivable by another computer or a user, the signal corresponding to the probability that the operational outcome of interest is likely to occur within a defined time period of interest.

5. The system of claim 1, wherein the at least one operational condition of interest includes a fault, failure, energy use, resource use, production quantity, production quality, compliance with required operational parameters, or operational cost metrics.

6. The system of claim 1, wherein the operating system, hardware device, or machine is associated with a vehicle, industrial machine or industrial process.

7. The system of claim 1, wherein the source data comprises information derived from:
   a. one or more sensors associated with the operating system, hardware device, or machine; and
   b. recorded information associated with operation of the operating system, hardware device, or machine.

8. The system of claim 7, wherein the one or more sensors comprise thermometers, hygrometers, pressure sensors, flow meters, vibration sensors, odometers, accelerometers, ammeters, voltmeters, power meters, digital multi-meters, digital imagers, microscopes, distance measurement devices, tackiness detectors, rigidity detectors, stiffness detectors, alignment detectors, pH detectors, GPS detectors, or combinations thereof.

9. The system of claim 1, wherein validating each of the plurality of probability models comprises testing the effectiveness of the supermodel against at least some of the source data selected from the data source prior to deployment for the prediction of the operational outcome of interest.

10. The system of claim 1, wherein at least a portion of the source data collected over the period of time is utilized to determine predicted outputs related to the probability that the operational outcome of interest is likely to occur using the currently deployed probability models in parallel with the generation and validation of the plurality of probability models.

11. A method for predicting at least one operational outcome of interest associated with an operating system, hardware device, or machine comprising:
   a. providing at least one computing device comprising at least one memory that stores computer-executable instructions and at least one processor for reading the computer-executable instructions;
   b. collecting, by the at least one computing device, source data collected over a period of time, wherein the source data is derived from information obtained from operation of the operating system, hardware device, or machine;
   c. creating, by the at least one computing device, feature data context values comprising feature data, wherein individual feature data context values comprise a set of feature data having at least one contextual relationship identifying a correlated context associated with the source data, wherein the set of feature data context values comprise information derived from the source data, the feature data comprising features aggregated based on one or more feature definitions associated with the at least one contextual relationship, and wherein the individual feature data context values comprise transformed information generated from the source data using the one or more feature definitions, and wherein the individual feature data context values are derived from source data corresponding to a plurality of operational parameters associated with operation of the operating system, hardware device, or machine during the period of time in which the source data was generated;
   d. analyzing, by the at least one computing device, the feature data context values by application of a plurality of statistical models, independently, to each of the feature data context values, the analysis generating a correlation between the feature data in each feature data context value and each of the plurality of statistical models that are applied, wherein each correlation between the feature data context values and each statistical model generates one of a plurality of probability models associated with a likelihood of occurrence of an operational outcome of interest during a operation of the operating system, hardware device, or machine;
   e. validating, by the at least one computing device, each of the plurality of probability models, by both:
      i. testing an effectiveness of each of the plurality of probability models, independently, against at least some of the source data selected from a data source prior to deployment for the prediction of the operational outcome of interest; and
      ii. combining some or all of the plurality of probability models to generate a supermodel and testing an effectiveness of the supermodel against at least some of the source data selected from the data source prior to deployment for the prediction of the operational outcome of interest;
   f. deploying, by the at least one computing device, at least one of the validated probability models for the prediction of the operational outcome of interest based on a comparison of results of the validation of the plurality of probability models and results of validation of currently deployed probability models against the at least some of the source data,
      wherein the method further comprises removing from use, by the at least one computing device, at least one currently deployed probability model that has been superseded by one or more subsequently generated probability models,
      wherein the subsequently generated probability models have an increased correlation with the likelihood of occurrence of the operational outcome of interest than the at least one currently deployed probability model, and
      wherein the increased correlation is determined, at least in part, by source data derived from information generated from operation of the operating system, hardware device, or machine that occurred after generation of the source data used to generate the at least one currently deployed probability model that was removed from use, and wherein removing at least some of the source data or feature data context values from each of the probability of models prior to analysis with the plurality of statistical models and to re-incorporate at least some of the removed data or feature data context values at a later time into the supermodel; and
   g. determining, by the at least one computing device using the deployed probability models, at least one predicted output related to a probability that the operational outcome of interest is likely to occur based at least in part upon current source data collected after deployment of the at least one validated probability model.

12. The method of claim 11, wherein the method further comprises:
   testing, by the at least one computing device, at least one of the validated probability models against updated source data prior to the deployment for the prediction of the operational outcome of interest, wherein the updated source data is derived from information obtained during continued operation of the operating system, hardware device, or machine.

13. The methods of claim 11, wherein the plurality of operational parameters are derived from information comprising one or more of at least times, locations, or environmental conditions associated with operation of the operating system, hardware device, or machine.

14. The method of claim 11, wherein the method further comprises generating a signal receivable by a computer or a user, the signal corresponding to the probability that the operational outcome of interest is likely to occur within a defined time period of interest.

15. The method of claim 11, wherein the at least one operational condition of interest includes a fault, failure, energy use, resource use, production quantity, production quality, compliance with required operational parameters, or operational cost metrics.

16. The method of claim 11, wherein the operating system, hardware device, or machine is associated with a vehicle, industrial machine or industrial process.

17. The method of claim 11, wherein the source data comprises information derived from:
   a. one or more sensors associated with the operating system, hardware device, or machine; and
   b. recorded information associated with operation of the operating system, hardware device, or machine.

18. The method of claim 17, wherein the recorded information comprises one or more of:
   a. maintenance records;
   b. temperature reports;
   c. environmental conditions;
   d. reports of the condition of devices or equipment associated with the operation of the operating system, hardware device, or machine; or
   e. records incorporating information regarding personnel associated with the operation of the operating system, hardware device, or machine.

\* \* \* \* \*